(12) United States Patent
Choi et al.

(10) Patent No.: US 11,306,890 B2
(45) Date of Patent: Apr. 19, 2022

(54) LIGHTING APPARATUS FOR VEHICLE HAVING A SCREEN AND PROJECTION UNIT

(71) Applicant: HYUNDAI MOBIS Co., Ltd., Seoul (KR)

(72) Inventors: Ban Suk Choi, Yongin-si (KR); Seung Woo Baek, Yongin-si (KR); Chi Yun Han, Yongin-si (KR); Jun Hyuk Cha, Yongin-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 0 days.

(21) Appl. No.: 17/139,564

(22) Filed: Dec. 31, 2020

(65) Prior Publication Data

US 2021/0254806 A1    Aug. 19, 2021

(30) Foreign Application Priority Data

Feb. 17, 2020  (KR) .......................... 10-2020-0019012

(51) Int. Cl.
| | |
|---|---|
| F21S 41/25 | (2018.01) |
| F21S 45/43 | (2018.01) |
| F21S 41/50 | (2018.01) |
| F21S 43/20 | (2018.01) |
| F21S 43/50 | (2018.01) |
| F21S 41/657 | (2018.01) |
| F21W 103/10 | (2018.01) |
| F21W 102/40 | (2018.01) |

(52) U.S. Cl.
CPC ............... *F21S 41/25* (2018.01); *F21S 41/50* (2018.01); *F21S 41/657* (2018.01); *F21S 43/26* (2018.01); *F21S 43/50* (2018.01); *F21S 45/43* (2018.01); *F21W 2102/40* (2018.01); *F21W 2103/10* (2018.01)

(58) Field of Classification Search
CPC ...... B60Q 2400/40; F21S 41/20; F21S 41/24; F21S 41/25; F21S 41/255; F21S 41/26; F21S 41/266; F21S 41/27; F21S 41/275; F21S 41/28; F21S 41/285; F21S 41/29; F21S 41/295
See application file for complete search history.

(56) References Cited

U.S. PATENT DOCUMENTS

| | | | |
|---|---|---|---|
| 7,481,561 B2* | 1/2009 | Okuda | ................. F21V 29/767 |
| | | | 362/539 |
| 10,101,580 B2* | 10/2018 | Mouri | ..................... F21V 29/70 |
| 10,576,874 B2 | 3/2020 | Kurashige et al. | |
| 10,775,011 B2* | 9/2020 | Kamiya | .................. F21S 41/00 |
| 10,837,617 B2 | 11/2020 | Kurashige et al. | |

(Continued)

FOREIGN PATENT DOCUMENTS

| | | |
|---|---|---|
| JP | 6094920 | 3/2017 |
| JP | 2019-089547 | 6/2019 |

(Continued)

*Primary Examiner* — Robert J May
(74) *Attorney, Agent, or Firm* — H.C. Park & Associates, PLC

(57) ABSTRACT

The present invention relates to a lighting apparatus for a vehicle that includes a housing; a screen unit mounted in the housing; and a projection unit fixed to the housing and configured to radiate light toward the screen unit.

15 Claims, 23 Drawing Sheets

(56) References Cited

U.S. PATENT DOCUMENTS

| | | | | |
|---|---|---|---|---|
| 2008/0205075 A1* | 8/2008 | Hikmet | ................ | F21V 14/003 362/488 |
| 2017/0106793 A1* | 4/2017 | Kumar | ................ | B60Q 9/005 |
| 2019/0361395 A1 | 11/2019 | Kurashige | | |

FOREIGN PATENT DOCUMENTS

| KR | 20-2012-0008497 | 12/2012 |
|---|---|---|
| KR | 10-2015-0072578 | 6/2015 |
| WO | 2018/124075 | 7/2018 |

* cited by examiner

LIGHTING APPARATUS FOR VEHICLE HAVING A SCREEN AND PROJECTION UNIT

CROSS-REFERENCE TO RELATED APPLICATION

This application claims priority from and the benefit of Korean Patent Application No. 10-2020-0019012, filed on Feb. 17, 2020, which is hereby incorporated by reference for all purposes as if set forth herein.

BACKGROUND

Field

Exemplary embodiments of the present disclosure relate to a lighting apparatus for a vehicle, and more particularly, to a lighting apparatus for a vehicle that can inform the location of the vehicle by radiating light onto an exterior of the vehicle or a road surface and guide the movement of the vehicle to surrounding objects.

Discussion of the Background

In general, a lamp of a vehicle is a device that is designed so as for a driver to check conditions and obstacles on a road or to signal other road users by illuminating the front of the vehicle during night driving and providing visual information to the driver.

In the related art, lighting of a front radiator grill refers to a method in which lighting is performed as in a lamp by using a light emitting diode (LED) direct light or indirect light illuminating device. In order to turn on the lighting in a large area such as the front radiator grill, a plurality of LED devices is required, resulting in an increase in cost.

Furthermore, since there is a lighting device on a front portion of a vehicle, there is a problem of damage due to external impacts and the like. Therefore, there is a need for solving such a problem.

The background art of the present disclosure is disclosed in Korean Patent Publication No. 10-2015-0072578 (published on Jun. 30, 2015 and entitled "Guide Lamp for Vehicle").

The above information disclosed in this Background section is only for enhancement of understanding of the background of the invention and, therefore, it may contain information that does not constitute prior art.

SUMMARY

Exemplary embodiments of the present invention provide a lighting apparatus for is a vehicle that can inform the location of the vehicle by radiating light onto an exterior of the vehicle or a road surface and guide the movement of the vehicle to surrounding objects.

In an embodiment, a lighting apparatus for a vehicle includes: a housing; a screen unit mounted in the housing; and a projection unit fixed to the housing and configured to radiate light toward the screen unit.

In the present disclosure, the projection unit includes: a casing fixed to the housing; and a lamp section fixedly mounted in the casing at a preset angle toward the screen unit and configured to radiate light toward the screen unit.

In the present disclosure, the lamp section includes: a light source mounted in the casing and configured to radiate light; a spectroscopic part disposed in front of the light source and configured to diffract or refract the light radiated from the light source; a pattern part disposed in front of the spectroscopic part and configured to form an image of the light radiated from the light source; and a projection lens part disposed in front of the pattern part and configured to expand the light radiated from the light source.

In the present disclosure, the light source radiates light obliquely downwardly at a preset angle from the casing toward the screen unit.

In the present disclosure, the lamp section further includes a cooling fan part mounted in the casing and configured to cool heat radiated from the light source.

In the present disclosure, at least one lamp section is disposed in the casing.

In the present disclosure, the projection unit is disposed on each side of the housing.

In the present disclosure, the screen unit includes a translucent acrylic material.

In the present disclosure, an image of the light radiated from the projection unit is formed on the screen unit.

In another embodiment, a lighting apparatus for a vehicle includes: a housing; a screen unit mounted in the housing; and a projection unit rotatably mounted in the housing and configured to radiate light toward the screen unit or a road surface while being rotated.

In the present disclosure, the projection unit includes: a casing; a lamp shaft section connected to the casing and rotatably mounted in the housing; and a lamp section mounted in the casing and configured to radiate light toward the screen unit or the road surface while being rotated according to rotation of the lamp shaft section.

In the present disclosure, the lamp section includes: a light source mounted in the casing and configured to radiate light; a spectroscopic part disposed in front of the light source and configured to diffract or refract the light radiated from the light source; a pattern part disposed in front of the spectroscopic part and configured to form an image of the light radiated from the light source; and a projection lens part disposed in front of the pattern part and configured to diffuse the light radiated from the light source.

In the present disclosure, the light source radiates light obliquely downwardly at a preset angle from the casing.

In the present disclosure, the lamp section further includes a cooling fan part mounted in the casing and configured to cool heat radiated from the light source.

In the present disclosure, at least one lamp section is disposed in the casing.

In the present disclosure, the projection unit is disposed on a side of the housing.

In the present disclosure, the screen unit includes a translucent acrylic material.

In the present disclosure, an image of the light radiated from the projection unit is formed on the screen unit.

In the present disclosure, the lamp shaft section is formed to be expandable and contractible and moves the casing up and down.

In the present disclosure, the lamp shaft section is mounted to move the casing from front to back and side to side.

In the present disclosure, rotation directions of the lamp section and the lamp shaft section are adjusted according to steering of a vehicle.

In the present disclosure, the projection unit further includes a driving section mounted on an end portion of the lamp shaft section and configured to move the lamp shaft section.

In the present disclosure, the projection unit implements a welcome lamp function of allowing a driver of a vehicle to recognize the vehicle by radiating an image set to the driver onto the road surface.

In the present disclosure, the projection unit implements a positioning lamp function in which the projection unit is rotated in the housing from inside to outside of the vehicle to indicate a width of the vehicle.

In further another embodiment, a lighting apparatus for a vehicle includes: a vehicle body; and a projection unit rotatably mounted on the vehicle body and configured to radiate light toward a surface of the vehicle body or a road surface, wherein the projection unit is mounted on at least one of a grill part side on a front portion of the vehicle body, a trunk part side, and a door part side.

In the present disclosure, the lighting apparatus for a vehicle further includes a screen unit mounted on the trunk part of the vehicle body and configured to display the light radiated from the projection unit.

In the present disclosure, the lighting apparatus for a vehicle further includes a screen unit mounted on the door part of the vehicle body and configured to display the light radiated from the projection unit.

According to the lighting apparatus for a vehicle in accordance with the present disclosure, when a driver approaches the vehicle, light is radiated onto the screen unit of the vehicle or the road surface, so that the driver may easily recognize the location of the vehicle.

Furthermore, in accordance with the present disclosure, light is radiated onto the screen unit of the vehicle or the road surface to notify driving of the vehicle to surrounding vehicles or pedestrians, so that it is possible to ensure safe driving.

Furthermore, in accordance with the present disclosure, light is radiated onto the screen unit of the vehicle or the road surface to display a guide phrase, a company brand logo, and the like, so that it is possible to improve the sense of luxury of the vehicle.

Furthermore, in accordance with the present disclosure, the projection units are disposed on both sides of the housing, so that the risk of damage due to external impacts and the like can be reduced compared to a case where the projection unit is disposed on the front side thereof, and the repair cost can be reduced.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
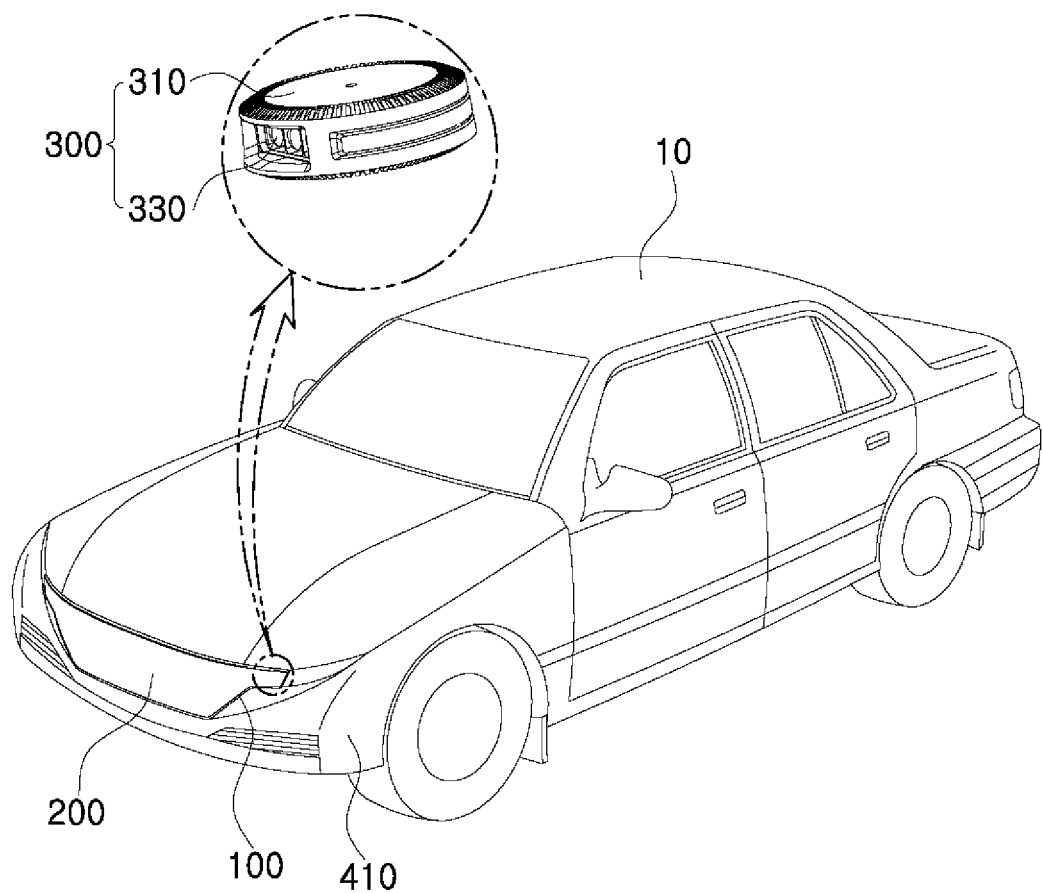
FIG. 1 is a perspective view schematically illustrating a lighting apparatus for a vehicle in accordance with an embodiment of the present disclosure.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ).

Unless particularly described to the contrary, the term "comprise", "configure", "have", or the like, which are described herein, will be understood to imply the inclusion of the stated components, and therefore should be construed as including other components, and not the exclusion of any other elements.

Hereinafter, embodiments of a lighting apparatus for a vehicle in accordance with an embodiment of the present disclosure will be described below with reference to the accompanying drawings.

Figure 2:
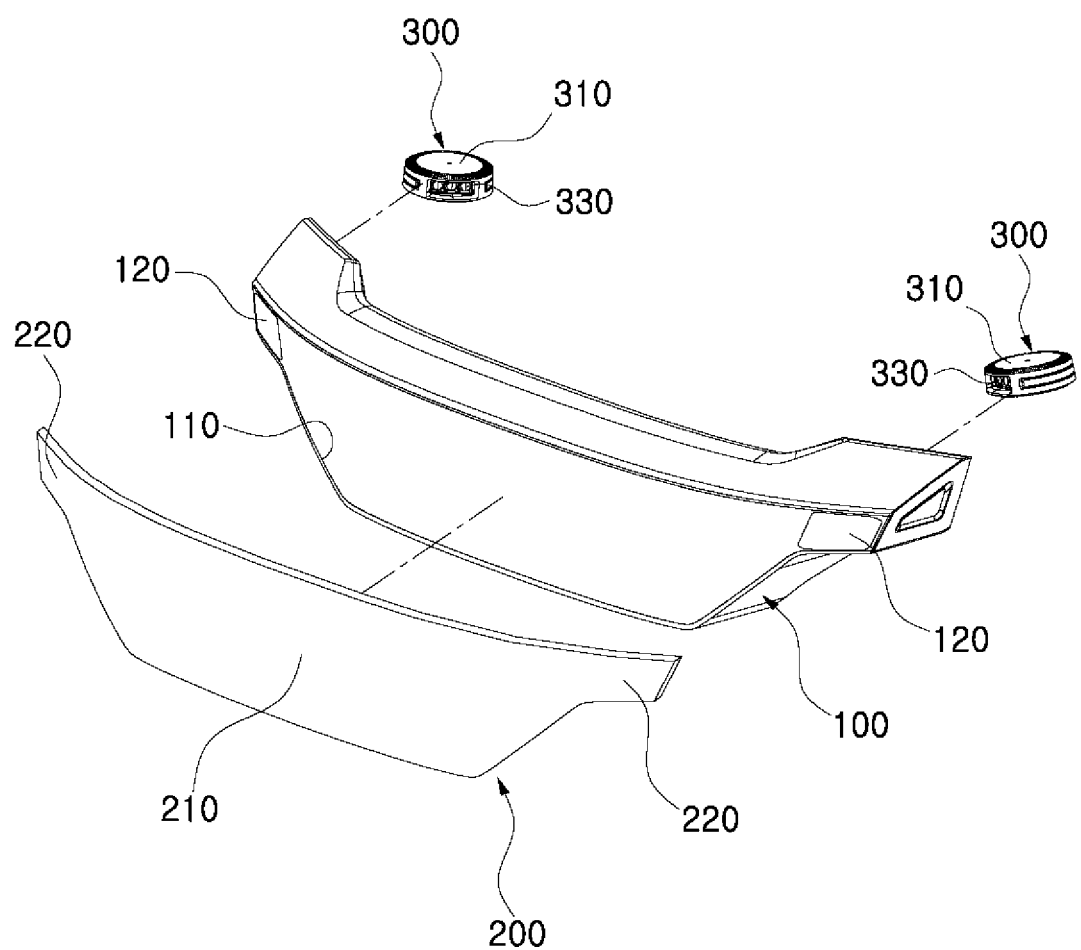
FIG. 2 is an assembled perspective view schematically illustrating the lighting apparatus for a vehicle in accordance with an embodiment of the present disclosure.
Figure 3:
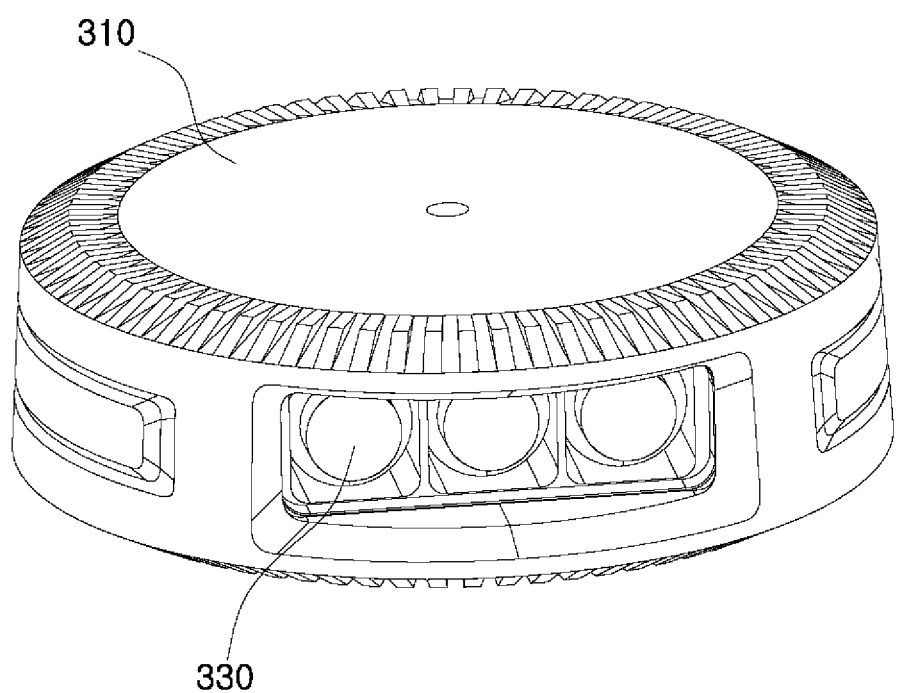
FIG. 3 is a perspective view schematically illustrating a lamp section in the lighting apparatus for a vehicle in accordance with an embodiment of the present disclosure.
Figure 4:
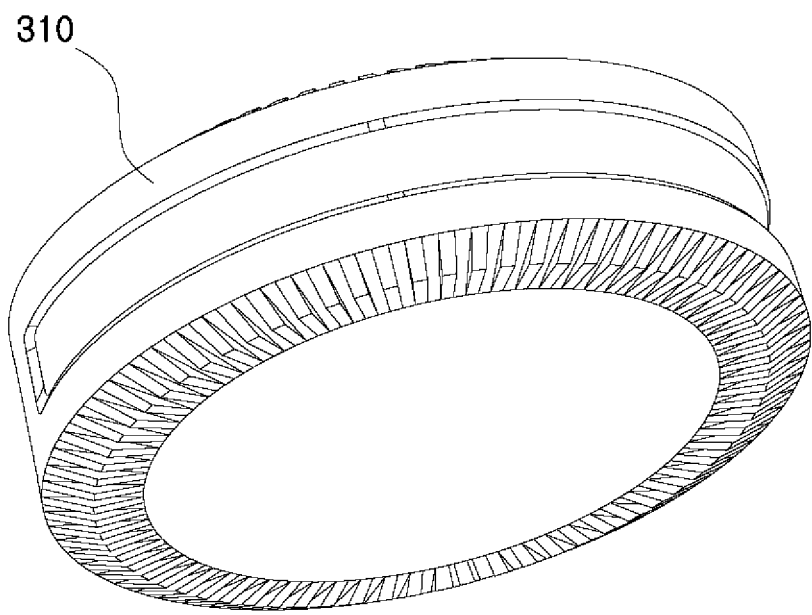
FIG. 4 is a bottom perspective view schematically illustrating the lamp section in the lighting apparatus for a vehicle in accordance with an embodiment of the present disclosure.
Figure 5:
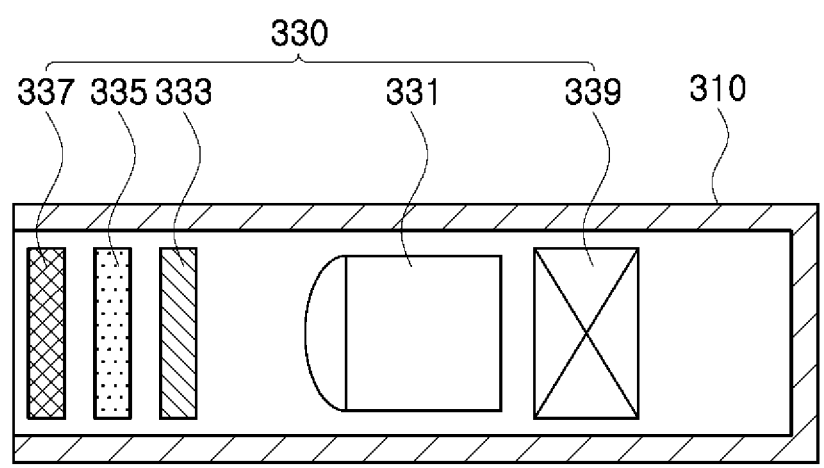
FIG. 5 is a sectional view schematically illustrating the lamp section in the lighting apparatus for a vehicle in accordance with an embodiment of the present disclosure.
Figure 6:
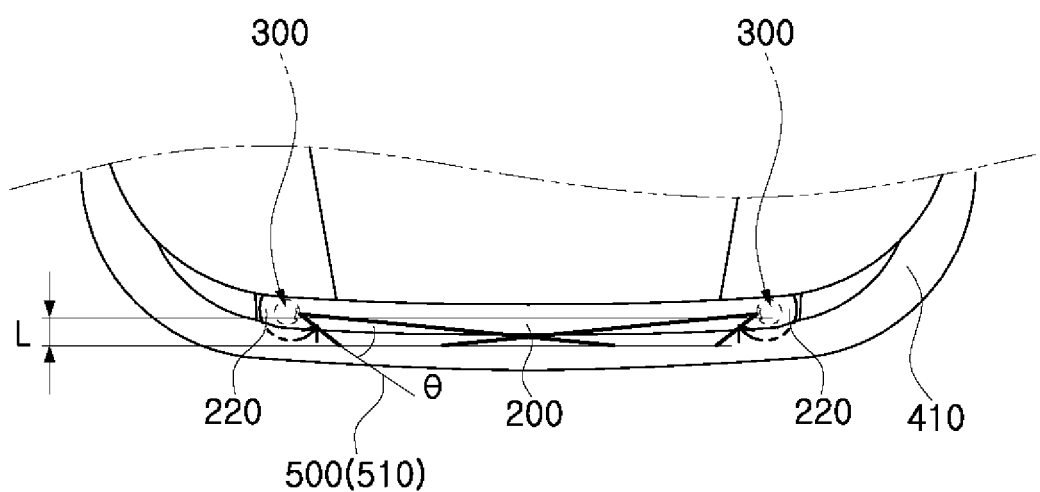
FIG. 6 is a plan view schematically illustrating that the lamp section radiates light onto a screen unit in the lighting apparatus for a vehicle in accordance with an embodiment of the present disclosure.
Figure 7:
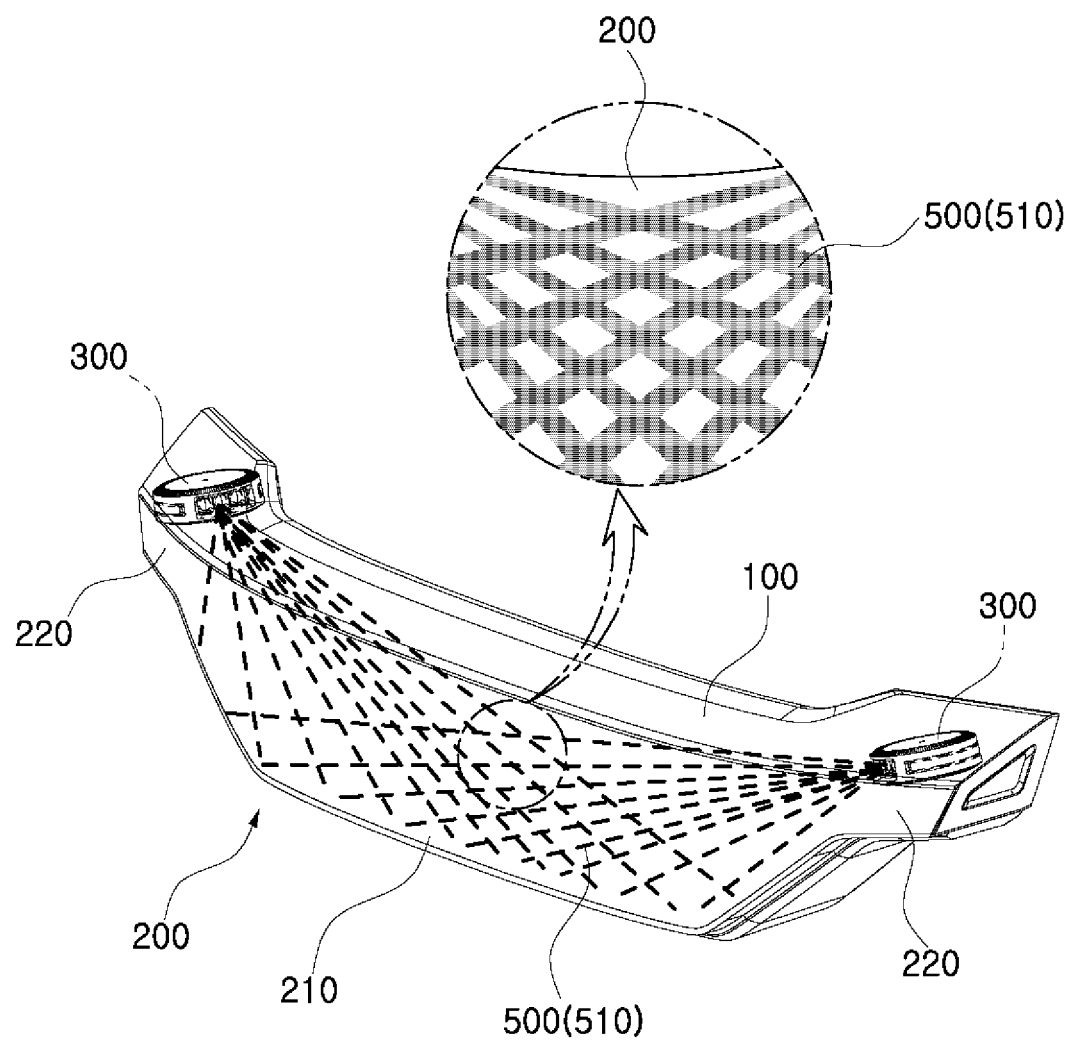
FIG. 7 is a perspective view schematically illustrating that the lamp section is radiates light onto the screen unit in the lighting apparatus for a vehicle in accordance with an embodiment of the present disclosure.
Figure 8:
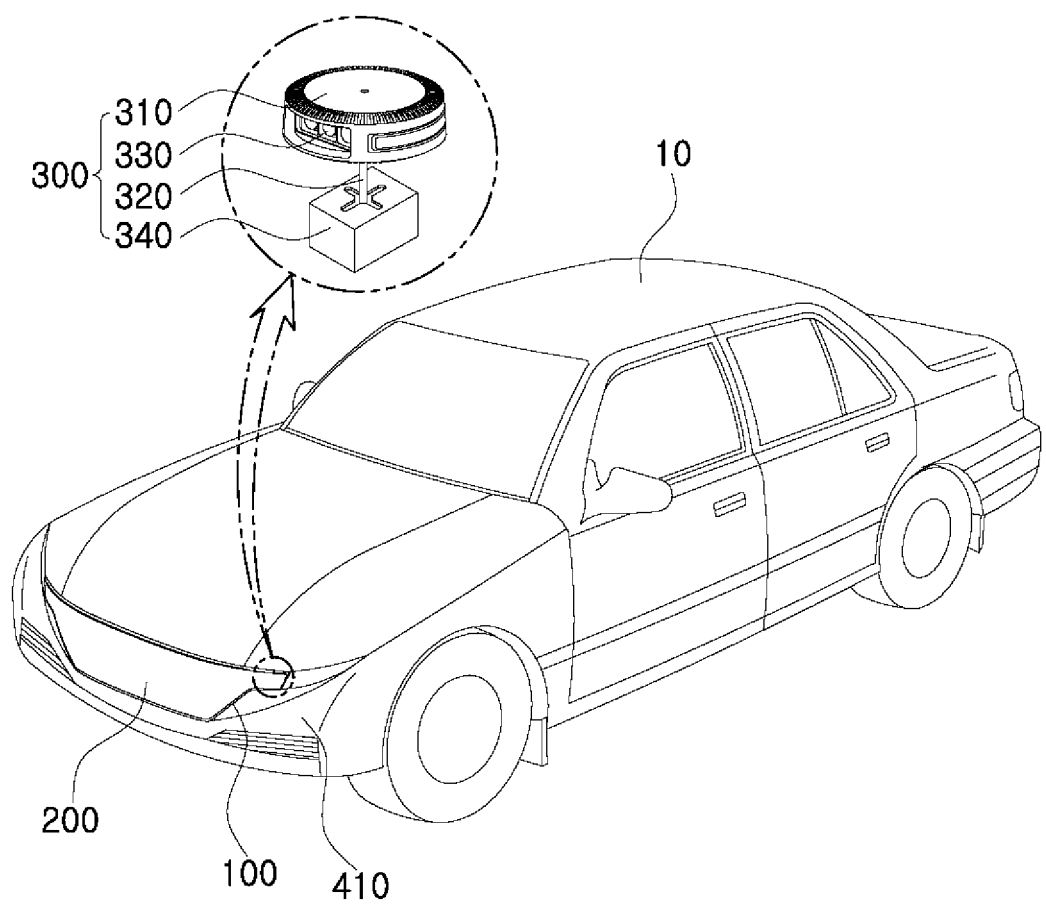
FIG. 8 is a perspective view schematically illustrating a lighting apparatus for a vehicle in accordance with another embodiment of the present disclosure.
Figure 9:
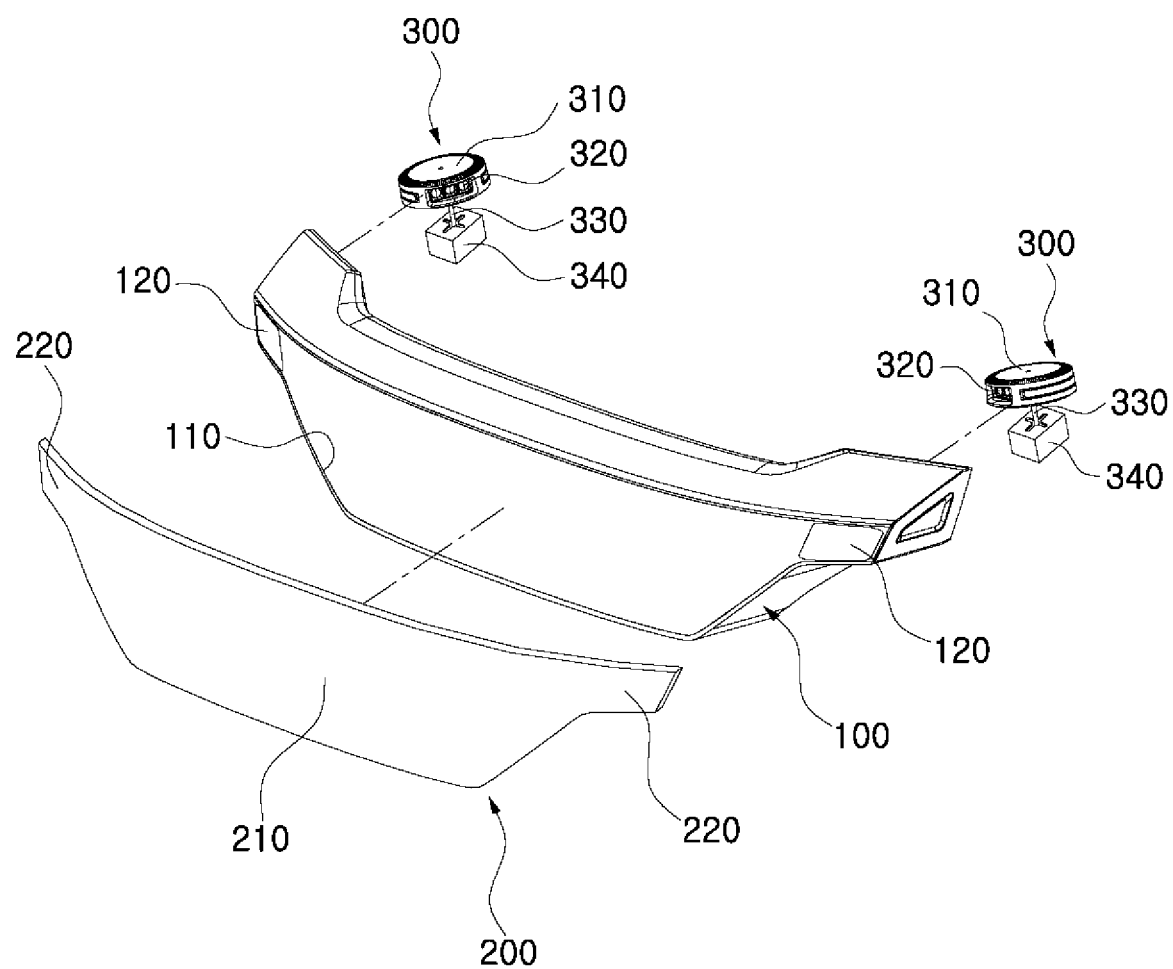
FIG. 9 is an assembled perspective view schematically illustrating the lighting apparatus for a vehicle in accordance with another embodiment of the present disclosure.
Figure 10:
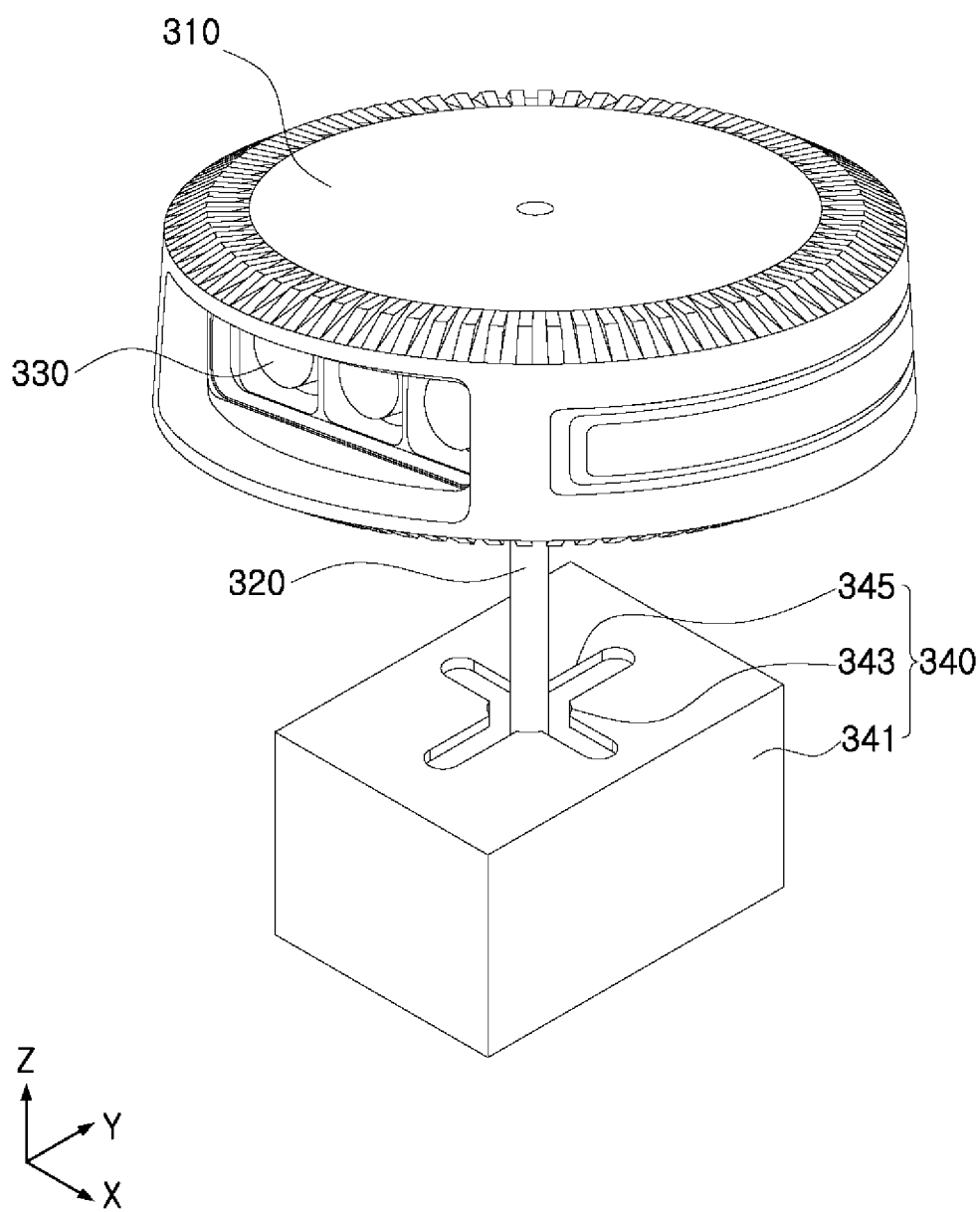
FIG. 10 is a perspective view schematically illustrating a lamp section in the lighting apparatus for a vehicle in accordance with another embodiment of the present disclosure.
Figure 11:
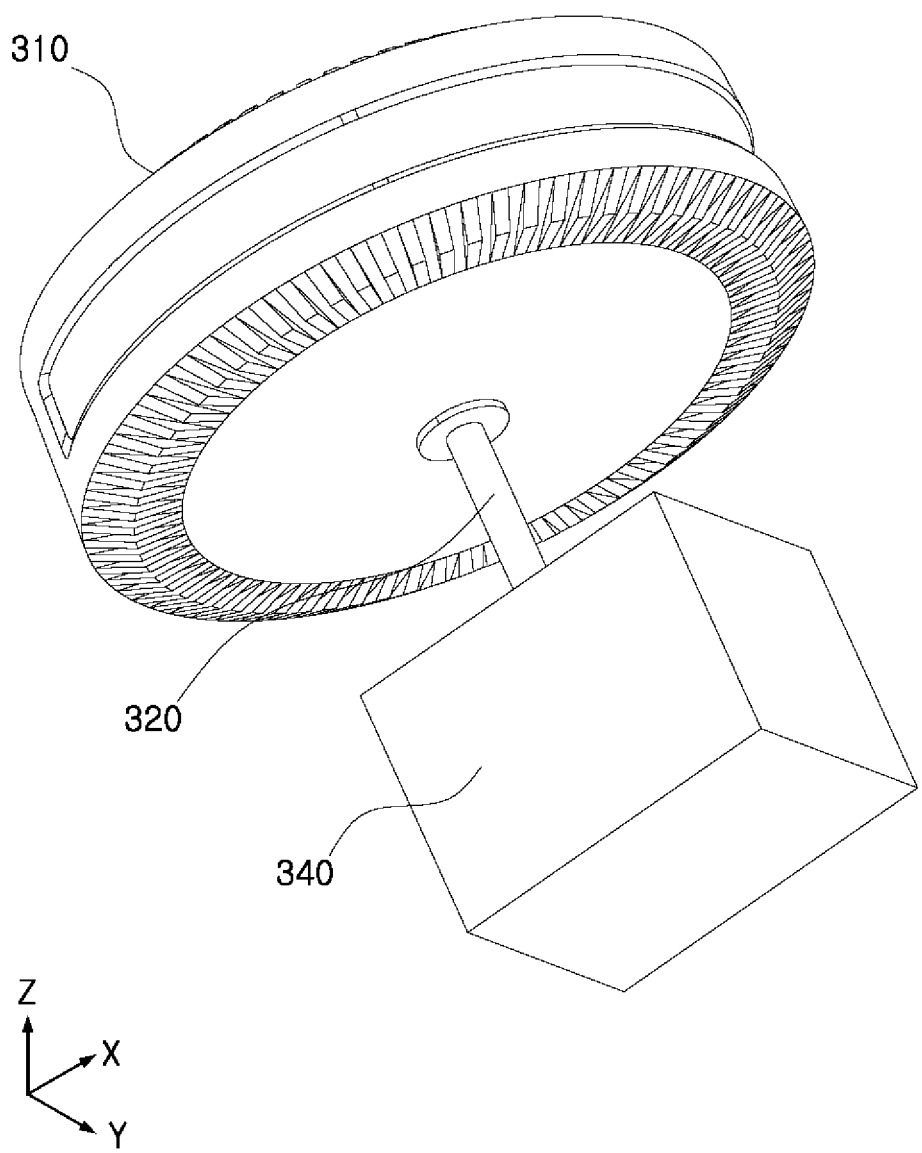
FIG. 11 is a bottom perspective view schematically illustrating the lamp section in the lighting apparatus for a vehicle in accordance with another embodiment of the present disclosure.
Figure 12:
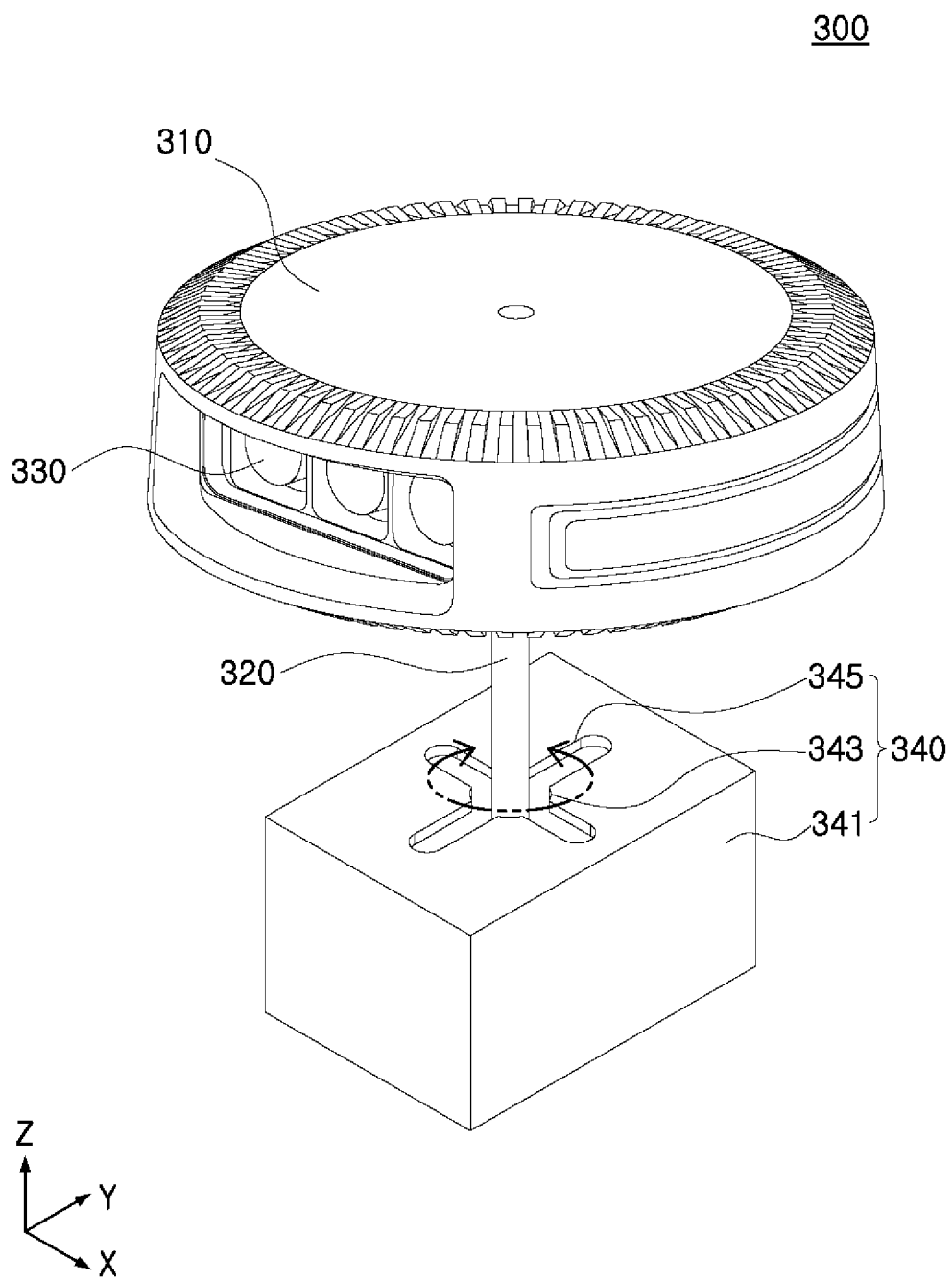
FIG. 12 is a perspective view schematically illustrating that the lamp section rotates in the lighting apparatus for a vehicle in accordance with another embodiment of the present disclosure.
Figure 13:
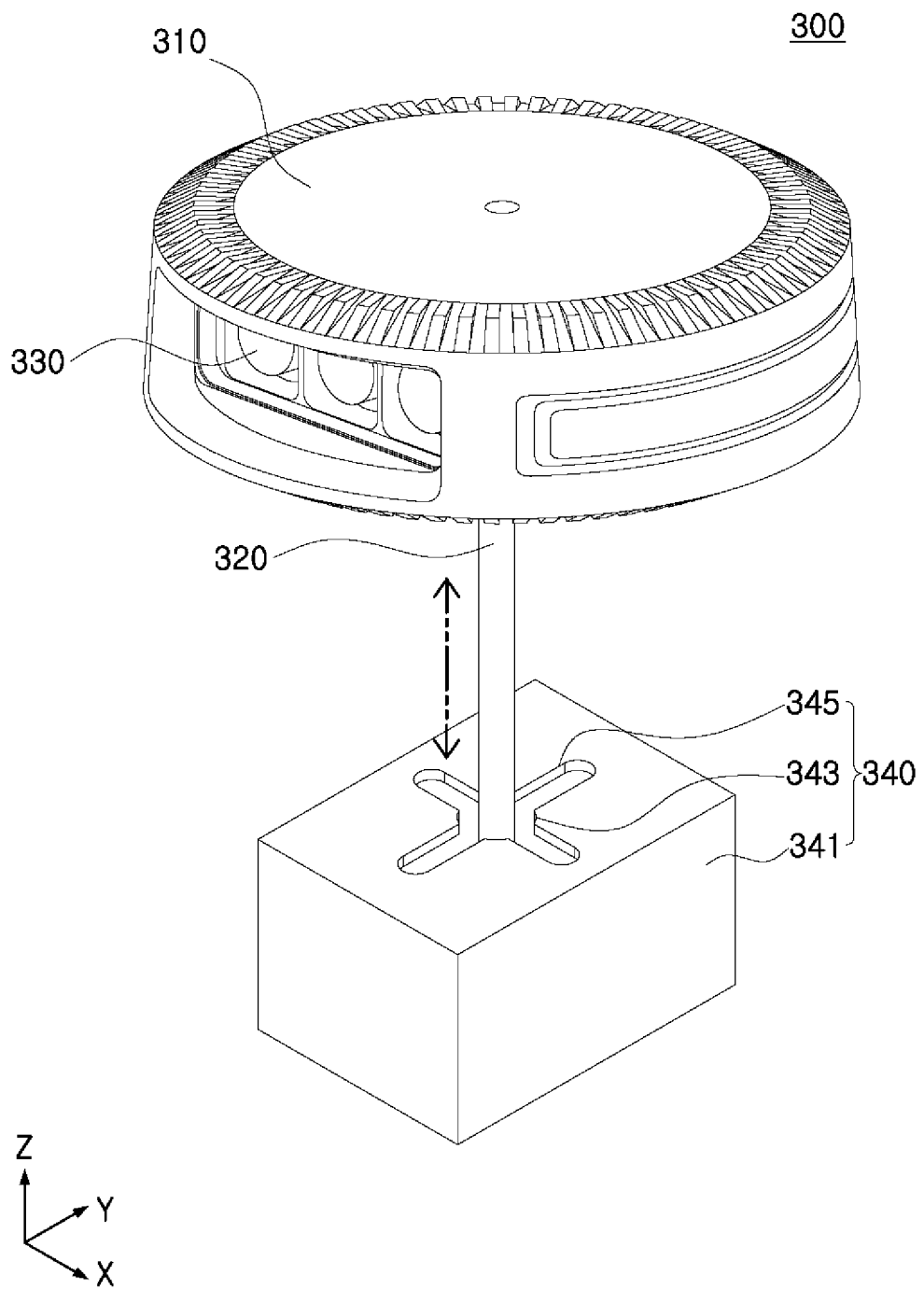
FIG. 13 is a perspective view schematically illustrating an operation in which the lamp section is moved up and down in the lighting apparatus for a vehicle in accordance with another embodiment of the present disclosure.
Figure 14:
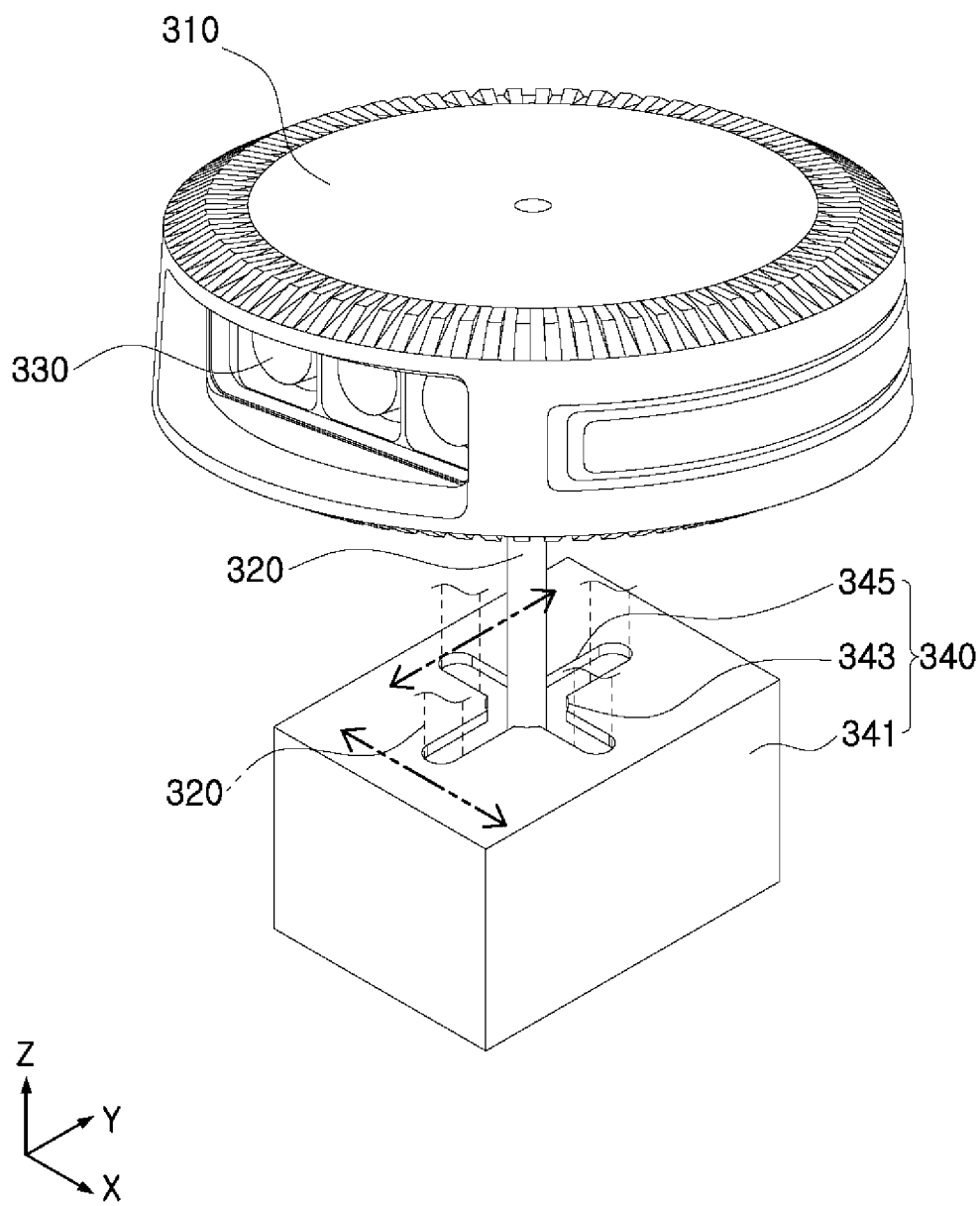
FIG. 14 is a perspective view schematically illustrating an operation in which the lamp section is moved from front to back and side to side in the lighting apparatus for a vehicle in accordance with another embodiment of the present disclosure.
Figure 15:
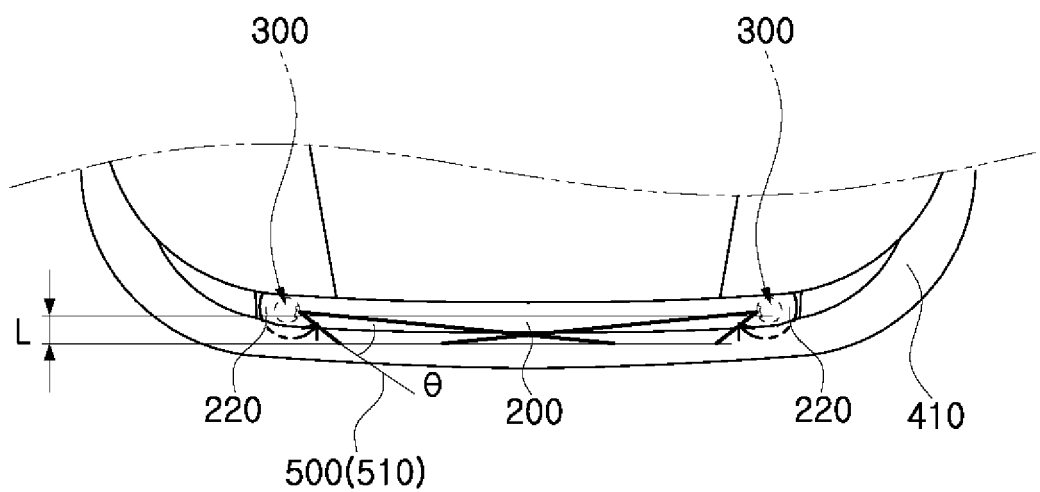
FIG. 15 is a plan view schematically illustrating that the lamp section radiates light onto a screen unit in the lighting apparatus for a vehicle in accordance with another embodiment of the present disclosure.
Figure 16:
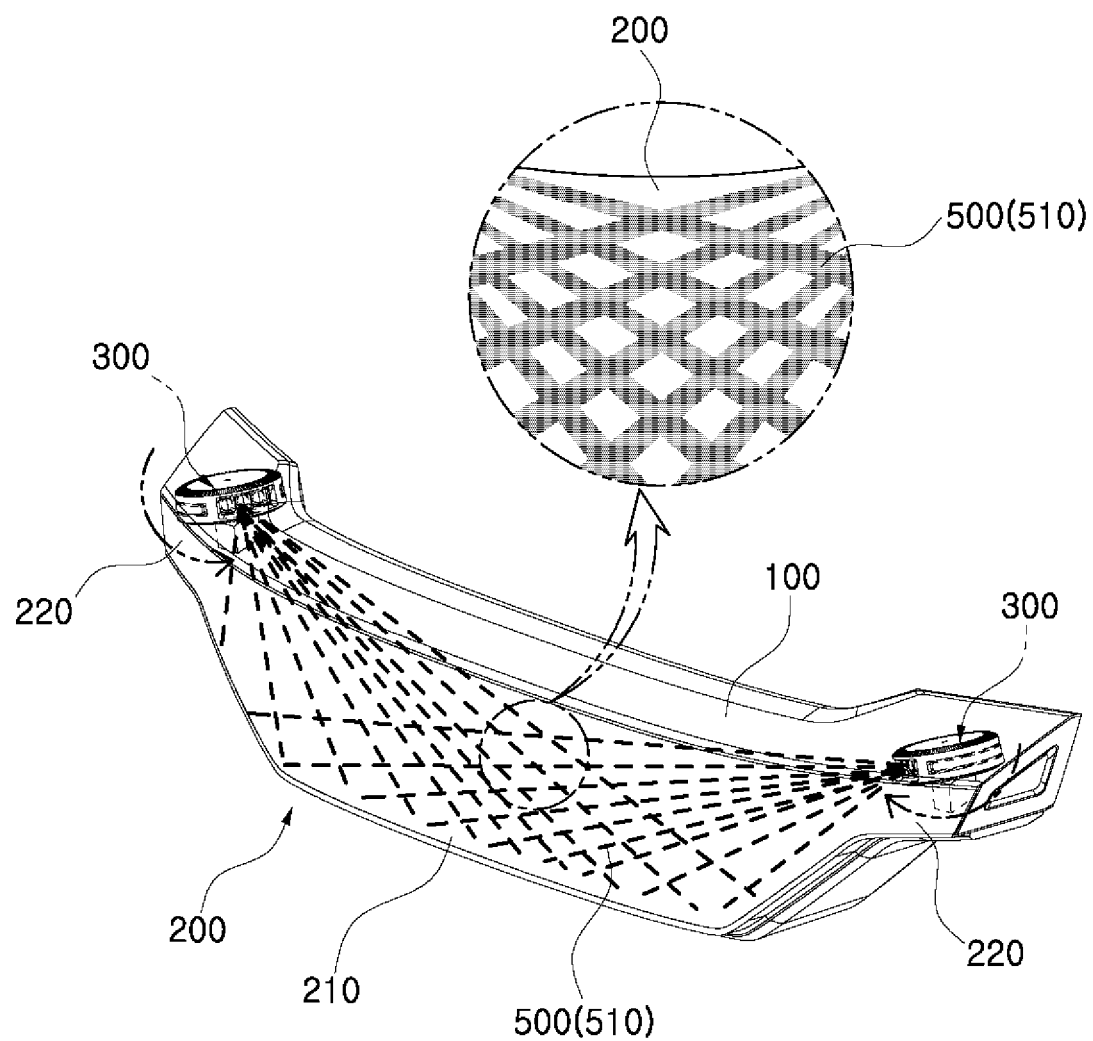
FIG. 16 is a perspective view schematically illustrating that the lamp section radiates light onto the screen unit in the lighting apparatus for a vehicle in accordance with another embodiment of the present disclosure.
Figure 17:
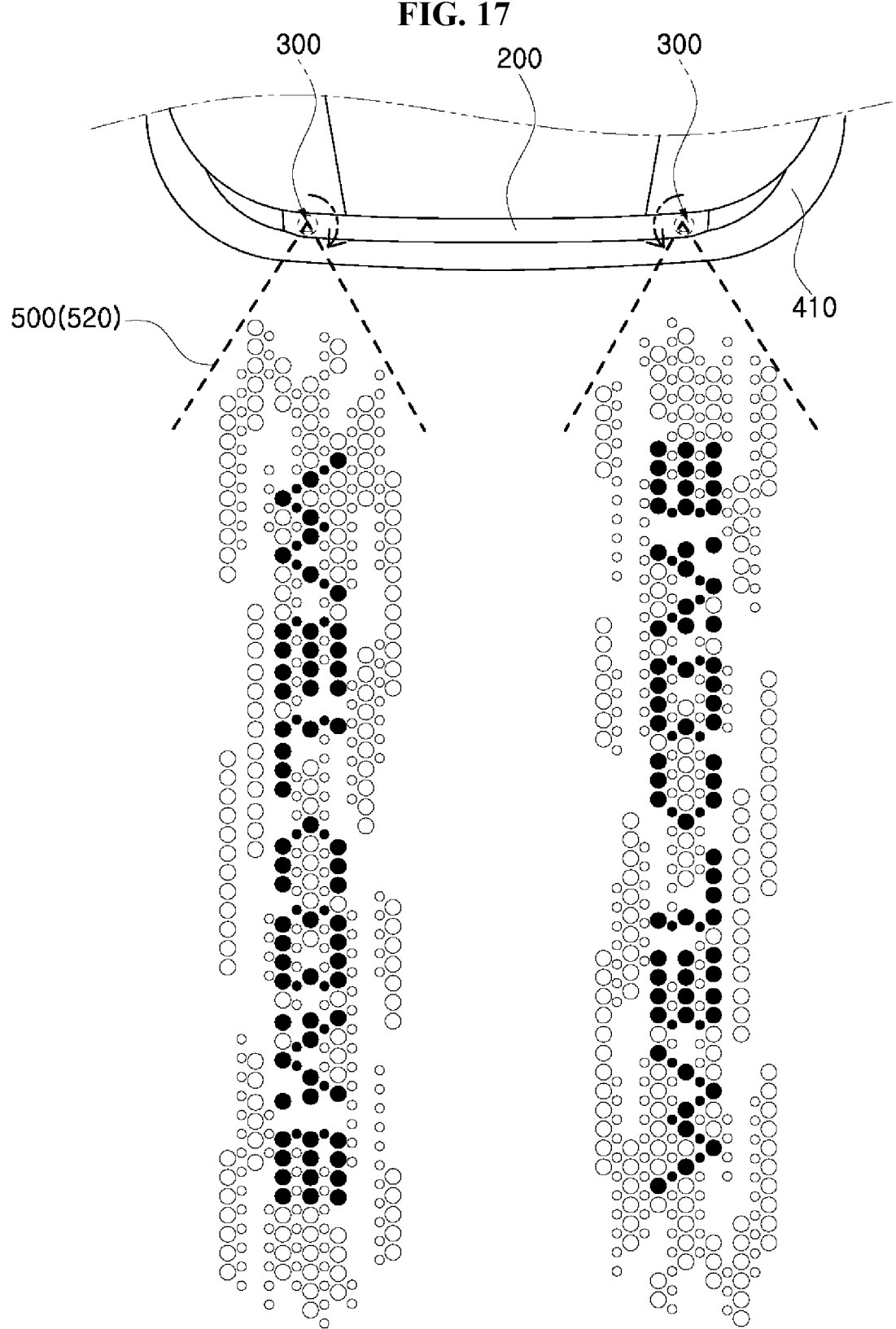
FIG. 17 is a plan view schematically illustrating that the lamp section radiates light toward a road surface in the lighting apparatus for a vehicle in accordance with another embodiment of the present disclosure.
Figure 18:
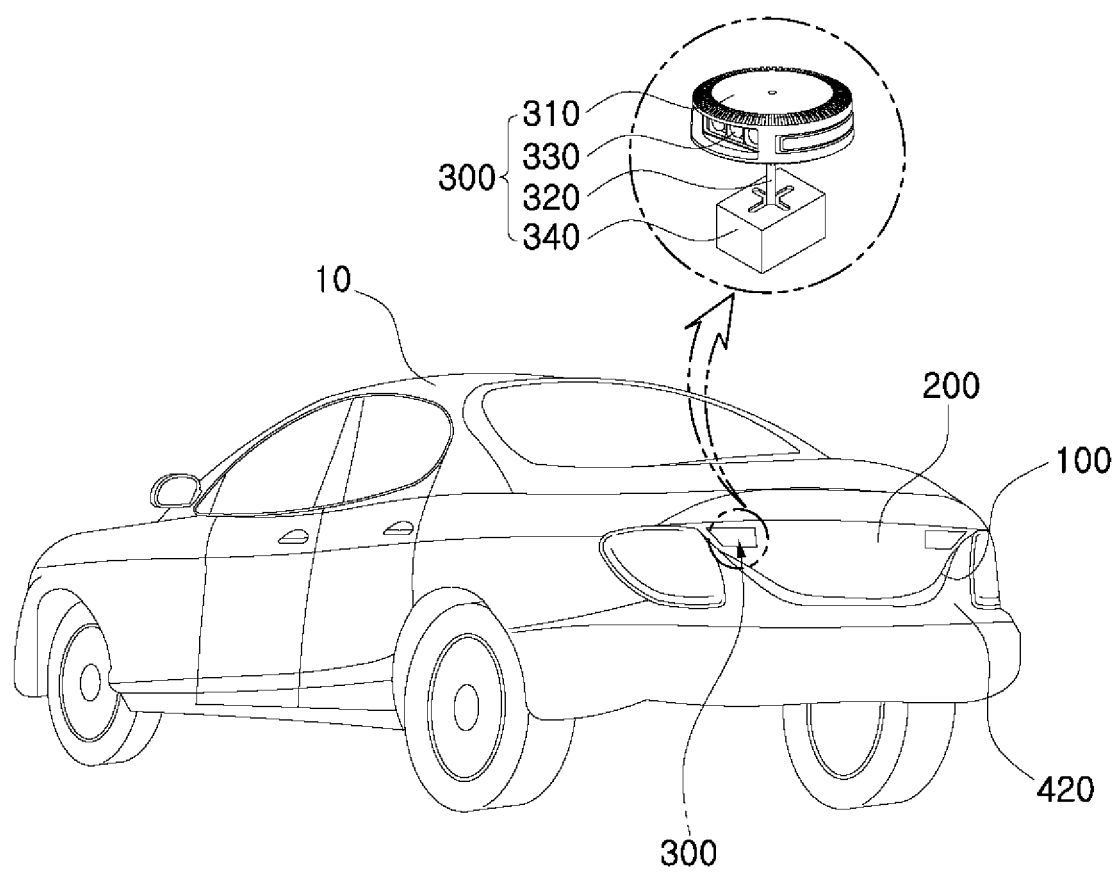
FIG. 18 is a perspective view schematically illustrating that a lighting apparatus for a vehicle in accordance with further another embodiment of the present disclosure is mounted on a rear side of the vehicle.
Figure 19:
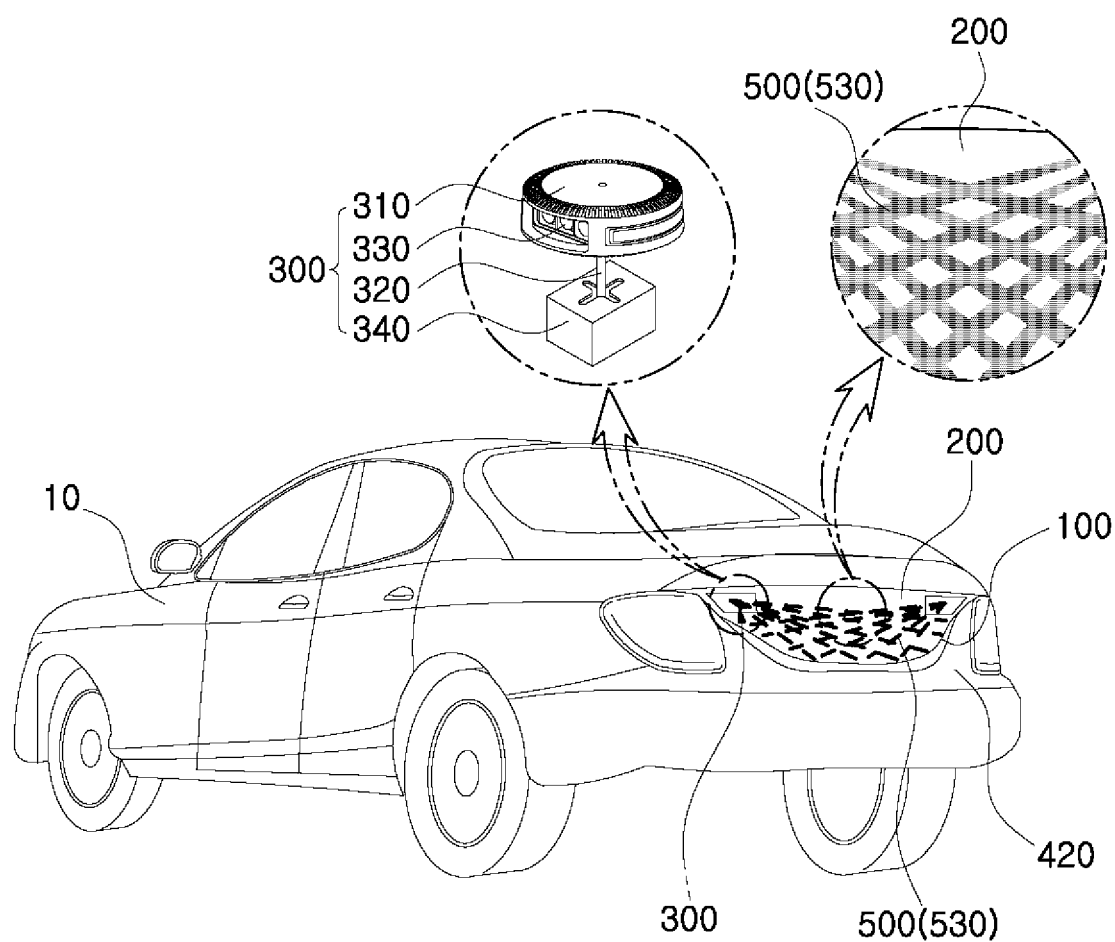
FIG. 19 is a perspective view schematically illustrating that the lighting apparatus for a vehicle in accordance with further another embodiment of the present disclosure radiates light onto the rear side of the vehicle.
Figure 20:
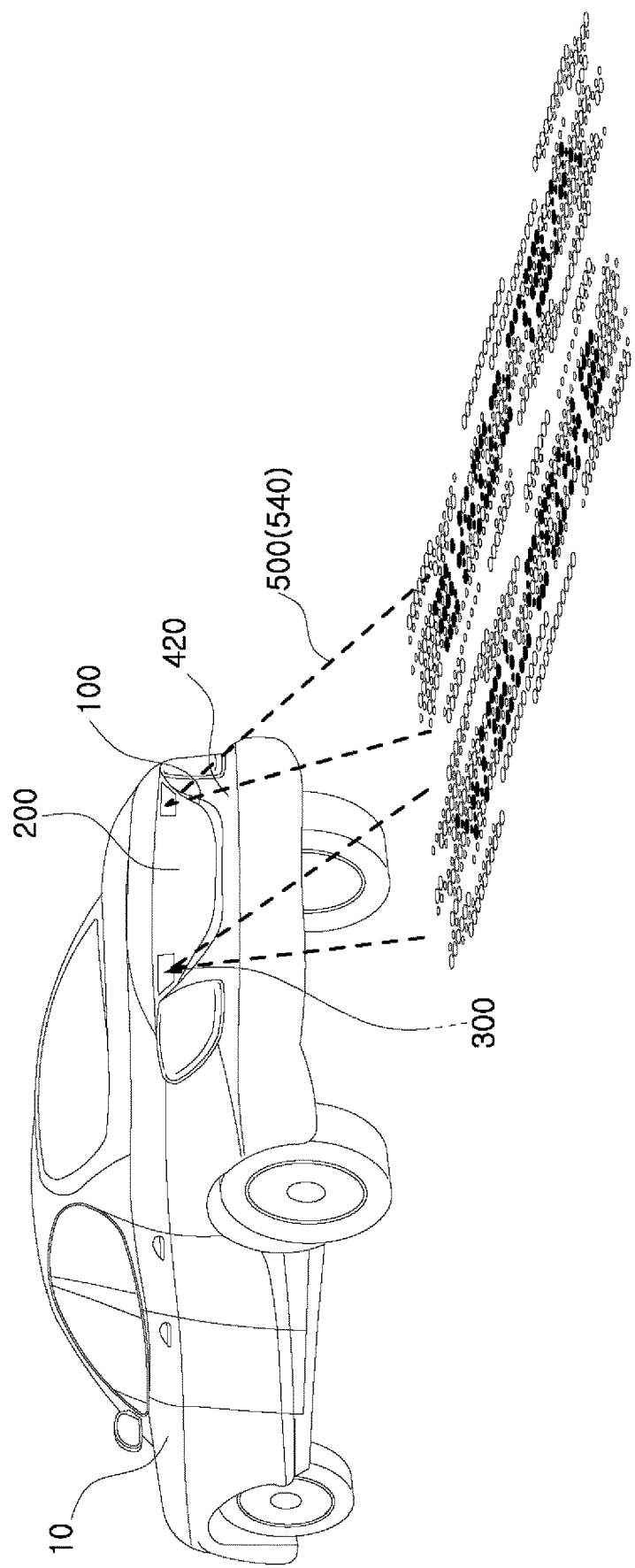
FIG. 20 is a perspective view schematically illustrating that the lighting apparatus for a vehicle in accordance with further another embodiment of the present disclosure radiates light onto a road surface on the rear side of the vehicle.
Figure 21:
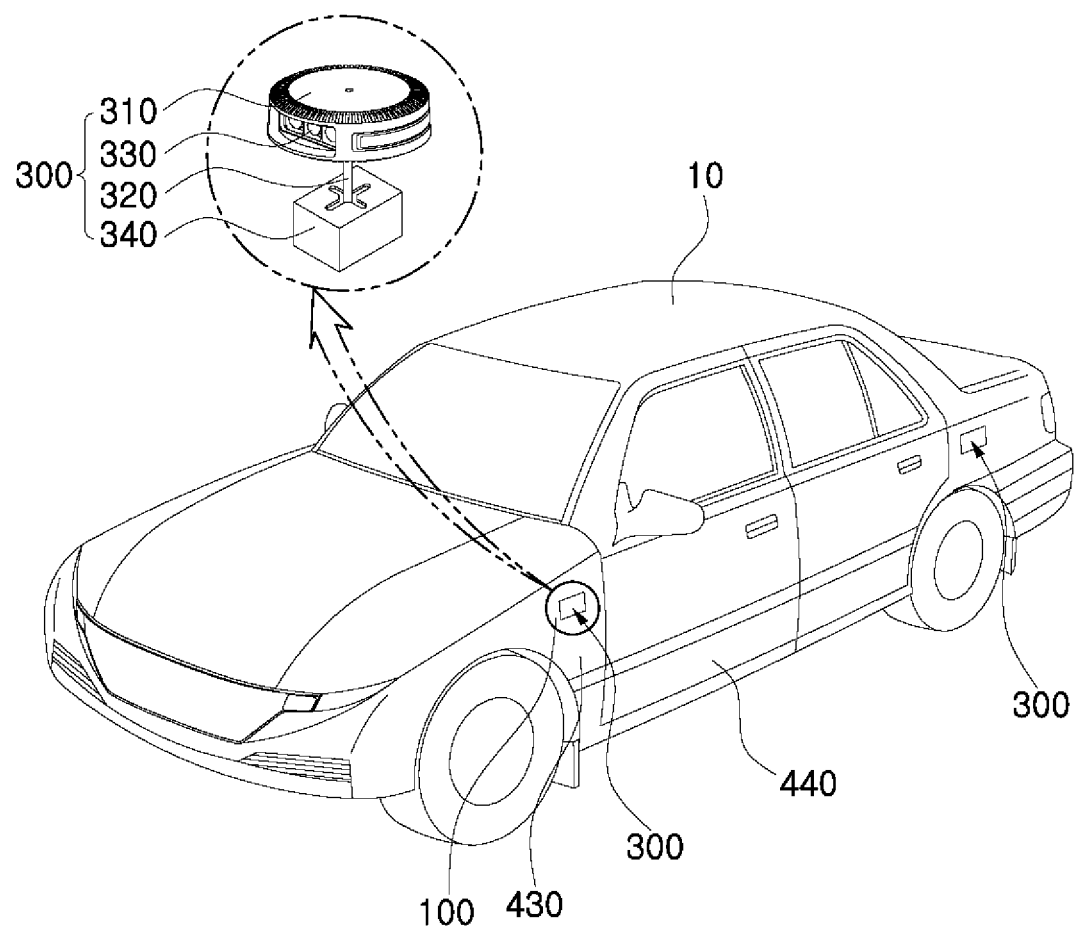
FIG. 21 is a perspective view schematically illustrating that the lighting apparatus for a vehicle in accordance with further another embodiment of the present disclosure is mounted on a lateral side of the vehicle.
Figure 22:
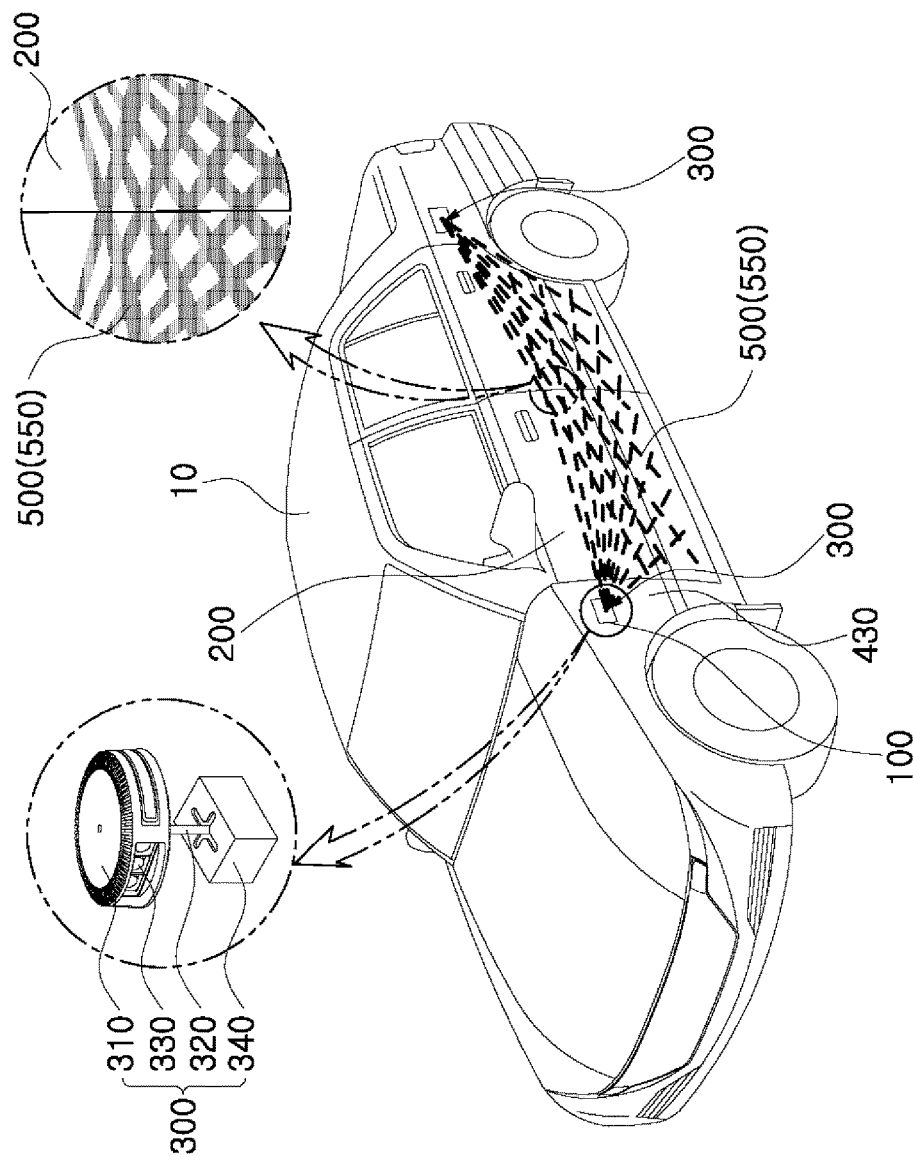
FIG. 22 is a perspective view schematically illustrating that the lighting apparatus for a vehicle in accordance with further another embodiment of the present disclosure radiates light onto the lateral side of the vehicle.
Figure 23:
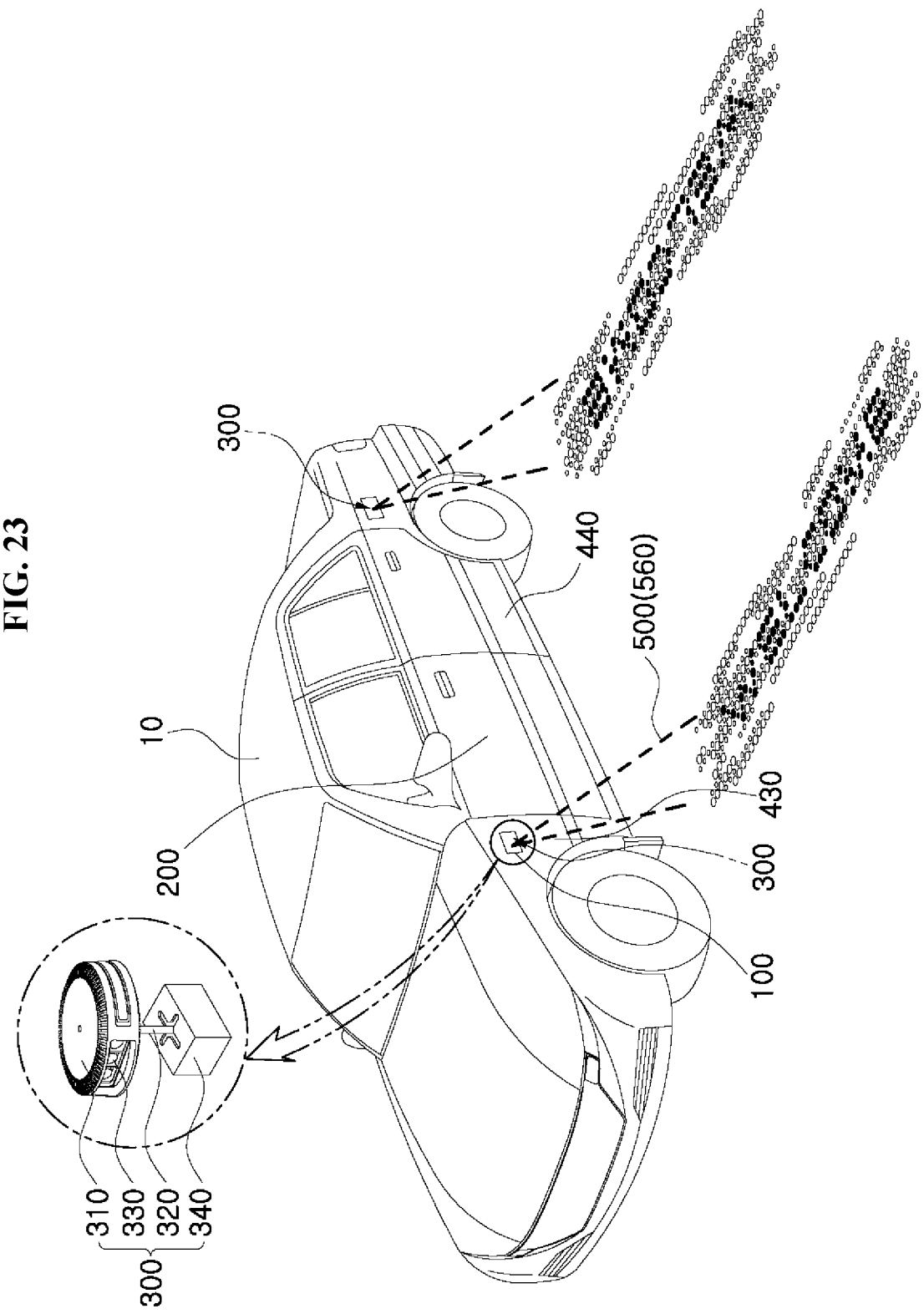
FIG. 23 is a perspective view schematically illustrating that the lighting apparatus for a vehicle in accordance with further another embodiment of the present disclosure radiates light onto a road surface on the lateral side of the vehicle.

FIG. 1 is a perspective view schematically illustrating a lighting apparatus for a vehicle in accordance with an embodiment of the present disclosure. FIG. 2 is an assembled perspective view schematically illustrating the lighting apparatus for a vehicle in accordance with an embodiment of the present disclosure. FIG. 3 is a perspective view schematically illustrating a lamp section in the lighting apparatus for a vehicle in accordance with an embodiment of the present disclosure. FIG. 4 is a bottom perspective view schematically illustrating the lamp section in the lighting apparatus for a vehicle in accordance with an embodiment of the present disclosure. FIG. 5 is a sectional view schematically illustrating the lamp section in the lighting apparatus for a vehicle in accordance with an embodiment of the present disclosure. FIG. 6 is a plan view schematically illustrating that the lamp section radiates light onto a screen unit in the lighting apparatus for a vehicle in accordance with an embodiment of the present disclosure. FIG. 7 is a perspective view schematically illustrating that the lamp section radiates light onto the screen unit in the lighting apparatus for a vehicle in accordance with an embodiment of the present disclosure. FIG. 8 is a perspective view schematically illustrating a lighting apparatus for a vehicle in accordance with another embodiment of the present disclosure. FIG. 9 is an assembled perspective view schematically illustrating the lighting apparatus for a vehicle in accordance with another embodiment of the present disclosure. FIG. 10 is a perspective view schematically illustrating a lamp section in the lighting apparatus for a vehicle in accordance with another embodiment of the present disclosure. FIG. 11 is a bottom perspective view schematically illustrating the lamp section in the lighting apparatus for a vehicle in accordance with another embodiment of the present disclosure. FIG. 12 is a perspective view schematically illustrating that the lamp section rotates in the lighting apparatus for a vehicle in accordance with another embodiment of the present disclosure. FIG. 13 is a perspective view schematically illustrating an operation in which the lamp section is moved up and down in the lighting apparatus for a vehicle in accordance with another embodiment of the present disclosure. FIG. 14 is a perspective view schematically illustrating an operation in which the lamp section is moved from front to back and side to side in the lighting apparatus for a vehicle in accordance with another embodiment of the present disclosure. FIG. 15 is a plan view schematically illustrating that the lamp section radiates light onto a screen unit in the lighting apparatus for a vehicle in accordance with another embodiment of the present disclosure. FIG. 16 is a perspective view schematically illustrating that the lamp section radiates light onto the screen unit in the lighting apparatus for a vehicle in accordance with another embodiment of the present disclosure. FIG. 17 is a plan view schematically illustrating that the lamp section radiates light toward a road surface in the lighting apparatus for a vehicle in accordance with another embodiment of the present disclosure. FIG. 18 is a perspective view schematically illustrating that a lighting apparatus for a vehicle in accordance with further another embodiment of the present disclosure is mounted on a rear side of the vehicle. FIG. 19 is a perspective view schematically illustrating that the lighting apparatus for a vehicle in accordance with further another embodiment of the present disclosure radiates light onto the rear side of the vehicle. FIG. 20 is a perspective view schematically illustrating that the lighting apparatus for a vehicle in accordance with further another embodiment of the present disclosure radiates light onto a road surface on the rear side of the vehicle. FIG. 21 is a perspective view schematically illustrating that the lighting apparatus for a vehicle in accordance with further another embodiment of the present disclosure is mounted on a lateral side of the vehicle. FIG. 22 is a perspective view schematically illustrating that the lighting apparatus for a vehicle in accordance with further another embodiment of the present disclosure radiates light onto the lateral side of the vehicle. FIG. 23 is a perspective view schematically illustrating that the lighting apparatus for a vehicle in accordance with further another embodiment of the present disclosure radiates light onto a road surface on the lateral side of the vehicle.

Hereinafter, FIG. 1 to FIG. 17 illustrate an example in which a lighting apparatus for a vehicle is mounted on a grill part 410 of a vehicle body of a vehicle 10. In the present disclosure, the vehicle 10 may include an autonomous vehicle as well as a general vehicle.

In FIG. 1 to FIG. 7, the lighting apparatus for a vehicle in accordance with an embodiment of the present disclosure includes a housing 100, a screen unit 200, and projection units 300. The housing 100 is mounted on the front portion of the vehicle body of the vehicle 10. In the present disclosure, the housing 100 is mounted inside the grill part 410 formed on the front portion of the vehicle body of the vehicle 10.

The housing 100 is formed at the center thereof with an opening 110. The screen unit 200 is mounted on the opening 110 of the housing 100. On a side of the housing 100, a receiving part 120 capable of receiving the projection unit 300 is formed. The projection unit 300 is disposed on the receiving part 120 formed on the side of the housing 100. The projection unit 300 may be disposed on both sides or one side of the housing 100. The projection unit 300 is fixedly disposed on the receiving part 120 at a preset angle.

The screen unit 200 is mounted on the front side (left side in FIG. 2) of the housing 100, and receives light radiated from the projection unit 300 and displays the light to the outside of the vehicle 10. That is, the screen unit 200 receives light radiated from the projection unit 300 and displays a pattern represented by the projection unit 300, and the pattern of the projection unit 300 formed on the screen unit 200 is displayed outside the vehicle 10.

The screen unit 200 is formed in a shape corresponding to the shape of the opening 110 of the housing 100. The screen unit 200 includes a screen body 210 and a side screen part 220. The screen body 210 is mounted on the opening 110 and the side screen part 220 is formed in a shape corresponding to the receiving part 120 on both sides of the screen body 210.

An image of the light radiated from the projection unit 300 is formed on the screen unit 200. The image of the light radiated from the projection unit 300 is formed through the screen unit 200 mounted on the housing 100 of the vehicle 10, so that the image can be clearly formed and easily recognized from an exterior.

Light 500 radiated from the projection unit 300 is diffused on the screen unit 200.

In the present disclosure, the light 500 (reference number 510 in FIG. 7) of the projection unit 300 fixed at a preset angle is diffused and recognized from an exterior. The shape of the light 510 diffused in the projection unit 300 is not limited to that illustrated in FIG. 7 and may be formed in various patterns.

As described above, the irradiation of the light 510 onto the screen body 210 of the screen unit 200 is referred to as "screen lighting". The screen lighting may serve as communication for surrounding vehicles, pedestrians and the like by radiating the light 510 having various patterns onto the screen body 210 of the screen unit 200.

The screen unit 200 is made of a diffusion paint or a diffusion sheet that diffuses light radiated from a light source 331 of a lamp section 330 of the projection unit 300. Furthermore, the screen unit 200 allows the light of the lamp section 330 of the projection unit 300 to pass therethrough and radiates the light to an exterior.

The projection unit 300 is fixed to the receiving part 120 of the housing 100 and radiates the light 510 toward the screen body 210 of the screen unit 200. The projection unit 300 includes a casing 310 and the lamp section 330. The casing 310 receives the light source 331, a spectroscopic part 333, a pattern part 335, a projection lens part 337, a cooling fan part 339, and the like in the internal space thereof.

The projection unit 300 is received in the housing 100 disposed inward by "L" from a protruding part of the vehicle 10 and can substantially prevent damage due to a vehicle collision and the like.

One surface (lower surface in FIG. 4) of the casing 310 is fixed to the receiving part 120 of the housing 100. The lamp section 330 is mounted in the internal space of the casing 310, and is disposed toward the screen body 210 of the screen unit 200 by the casing 310 fixed to the receiving part 120 of the housing 100. The lamp section 330 includes the light source 331, the spectroscopic part 333, the pattern part 335, and the projection lens part 337.

At least one lamp section 330 is disposed in the casing 310. The number of lamp sections 330 is adjusted according to the concept of the vehicle 10. The respective lamp sections 330 may employ patterns different in design or image.

The light source 331 is mounted in the internal space of the casing 310 and radiates light. The light source 331 is mounted in the casing 310, receives electric power from an exterior or an interior, and radiates light.

The light source 331 includes a multicolor lens capable of adjusting the color of light under the control of a control unit (not illustrated) or a monochromatic lens. As the color of light radiated from the light source 331 is adjusted, it is possible to clarify a pattern guided to driving or an exterior. In the present disclosure, the light source 331 includes a combination of multicolor light emitting diodes (LEDs). Alternatively, the light source 331 may include a monochromatic lens, so that the color of light radiated from the light source 331 may be clearly recognized from an exterior.

At least one light source 331 is disposed in the casing 310. The number of light sources 331 is adjusted according to the concept of the vehicle 10. The respective light sources 331 may employ patterns different in design or image.

The light source 331 radiates light obliquely downwardly at a preset angle from the receiving part 120 of the housing 100. The light source 331 radiates light onto the screen unit 200 obliquely downwardly at a preset angle, so that the location and the like of the vehicle 10 can be easily recognized from an exterior. Accordingly, it is possible to check the location of the vehicle 10 and substantially prevent safety accidents of surrounding pedestrians and the like.

The spectroscopic part 333 is disposed in front of the light source 331 and diffracts or refracts the light radiated from the light source 331. The spectroscopic part 333 collects the light radiated from the light source 331 and diffracts or refracts the collected light. The spectroscopic part 333 includes a transparent material capable of allowing the light of the light source 331 to pass through the pattern part 335. The spectroscopic part 333 includes at least one lens. The spectroscopic part 333 may include a plurality of combinations of lenses.

The pattern part 335 is disposed in front of the spectroscopic part 333, is interposed between the spectroscopic part 333 and the projection lens part 337 and forms an image. As the light emitted from the light source 331 passes through the pattern part 335, various images may be formed at an exterior according to a selection signal of the control unit.

In the present disclosure, the lamp section 330 further includes the cooling fan part 339. The cooling fan part 339 is mounted in the casing 310 and cools heat radiated from the light source 331. The cooling fan part 339 blows air to the light source 331 and cools the light source 331. The light source 331 is cooled by the cooling fan part 339, so that it is possible to substantially prevent the occurrence of failure due to excessive heat in the light source 331.

Furthermore, the casing 310 is formed as a heat sink, and radiates the heat radiated from the lamp section 330 to an exterior. A plurality of fins may be disposed on the surface of the casing 310 and cool the heat of the lamp section 330 by heat exchange with outside air.

In the present disclosure, at least one lamp section 330 is disposed in the casing 310. Although FIG. 3 illustrates that three lamp sections 330 are disposed in the casing 310, the present disclosure is not limited thereto. One or more lamp sections 330 are disposed in the casing 310, so that it is possible to adjust the image formation and irradiation range according to an increase or decrease in the number of lamp sections 330.

Referring to FIG. 8 to FIG. 17, a lighting apparatus for a vehicle in accordance with another embodiment of the present disclosure includes the housing 100, the screen unit 200, and the projection units 300. The description of the housing 100 and the screen unit 200 is applied to the housing 100 and the screen unit 200 in accordance with another embodiment of the present disclosure.

In another embodiment of the present disclosure, "road surface lighting" as well as the aforementioned "screen lighting" indicating the irradiation of the light 510 onto the screen body 210 of the screen unit 200 may be performed.

The "road surface lighting" may serve as communication by radiating light 520 toward a road surface from the projection unit 300 and informing surrounding vehicles, pedestrians and the like of vehicle driving information and the like through light 520 having various patterns on the road surface.

The projection unit 300 is rotatably mounted in the receiving part 120 of the housing 100. The projection unit 300 radiates the light 510 toward the screen unit 200 while being rotated in the receiving part 120 of the housing 100 or radiates the light 500 (520) toward the road surface through the side screen part 220 of the screen unit 200.

The projection unit 300 implements a welcome lamp (Welcome Lamp) function of allowing a driver of the vehicle 10 to recognize the vehicle 10 by radiating an image set to the driver onto the road surface. The projection unit 300 radiates the image set to the driver onto the road surface, so that the driver can recognize whether the vehicle 10 is owned by the driver.

When the driver gets in the vehicle 10, an image pattern of light to be radiated from the projection unit 300 onto the road surface is radiated toward the screen unit 200 of the vehicle 10.

The projection unit 300 implements a positioning lamp (Position Lamp) function in which the projection unit 300 is rotated in the housing 100 from inside to outside of the vehicle 10 to indicate the width of the vehicle 10.

The projection unit 300 is rotated to correspond to the width of the vehicle 10 to indicate the width of the vehicle 10, so that the width or the presence of the vehicle 10 can be recognized from an exterior. Accordingly, the projection unit 300 implements the positioning lamp function, so that it is possible to substantially prevent an accident due to a collision between vehicles 10 at night or when fog occurs.

Consequently, in the present disclosure, the projection unit 300 can implement the positioning lamp function as well as the welcome lamp function.

In the present disclosure, the projection unit 300 includes the casing 310, a lamp shaft section 320, and the lamp section 330.

The projection unit 300 is fixed to the receiving part 120 of the housing 100 and radiates the light 510 toward the screen body 210 of the screen unit 200. The projection unit 300 includes the casing 310, the lamp shaft section 320, and the lamp section 330. The casing 310 receives the light source 331, the spectroscopic part 333, the pattern part 335, the projection lens part 337, the cooling fan part 339, and the like in the internal space thereof.

One surface (lower surface in FIG. 10) of the casing 310 is connected to the lamp shaft section 320. The lamp shaft section 320 is connected to one surface of the casing 310 and fixed to the receiving part 120 of the housing 100. The lamp shaft section 320 is fixed to the receiving part 120 of the housing 100 by welding or bolting.

The lamp section 330 is mounted in the internal space of the casing 310, and is disposed toward the screen unit 200 by the lamp shaft section 320 fixed to the receiving part 120 of the housing 100. The lamp section 330 includes the light source 331, the spectroscopic part 333, the pattern part 335, and the projection lens part 337.

At least one lamp section 330 is disposed in the casing 310. The number of lamp sections 330 is adjusted according to the concept of the vehicle 10. The respective lamp sections 330 may employ patterns different in design or image. Since the lamp section 330 may be rotated by the lamp shaft section 320, the size of a diameter of the light source increases in proportion to an increase in the number of lamp sections 330.

The light source 331 is mounted in the internal space of the casing 310 and radiates light. The light source 331 is mounted in the casing 310, receives electric power from an exterior or an interior, and radiates light.

The light source 331 includes a multicolor lens capable of adjusting the color of light under the control of the control unit or a monochromatic lens. As the color of light radiated from the light source 331 is adjusted, it is possible to clarify driving, or a pattern guided to an exterior. In the present disclosure, the light source 331 includes a combination of multicolor light emitting diodes (LEDs). Alternatively, the light source 331 may include a monochromatic lens, so that the color of light radiated from the light source 331 may be clearly recognized from an exterior.

At least one light source 331 is disposed in the casing 310. The number of light sources 331 is adjusted according to the concept of the vehicle 10. The respective light sources 331 may employ patterns different in design or image.

The light source 331 radiates light obliquely downwardly at a preset angle from the receiving part 120 of the housing 100. The light source 331 radiates light onto the screen unit 200 obliquely downwardly at a preset angle, so that the location and the like of the vehicle 10 can be easily recognized from an exterior. Accordingly, it is possible to check the location of the vehicle 10 and substantially prevent safety accidents of surrounding pedestrians and the like.

The spectroscopic part 333 is disposed in front of the light source 331 and diffracts or refracts the light radiated from the light source 331. The spectroscopic part 333 collects the light radiated from the light source 331 and diffracts or refracts the collected light.

The spectroscopic part 333 includes a transparent material capable of allowing the light of the light source 331 to pass therethrough the pattern part 335. The spectroscopic part 333 includes at least one lens. The spectroscopic part 333 may include a plurality of combinations of lenses.

The pattern part 335 is disposed in front of the spectroscopic part 333, is interposed between the spectroscopic part 333 and the projection lens part 337 and forms an image. As the light emitted from the light source 331 passes through the pattern part 335, various images may be formed at an exterior according to a selection signal of the control unit.

In the present disclosure, the lamp section 330 further includes the cooling fan part 339. The cooling fan part 339 is mounted in the casing 310 and cools heat radiated from the light source 331. The cooling fan part 339 blows air to the light source 331 and cools the light source 331. The light source 331 is cooled by the cooling fan part 339, so that it is possible to substantially prevent the occurrence of failure due to excessive heat in the light source 331.

Furthermore, the casing 310 is formed as a heat sink, and radiates the heat radiated from the lamp section 330 to an exterior. A plurality of fins may be disposed on the surface of the casing 310 and may cool the heat of the lamp section 330 by heat exchange with outside air.

In the present disclosure, at least one lamp section 330 is disposed in the casing 310. Although FIG. 10 illustrates that three lamp sections 330 are disposed in the casing 310, the present disclosure is not limited thereto. One or more lamp sections 330 are disposed in the casing 310, so that it is possible to adjust the image formation and irradiation range according to an increase or decrease in the number of lamp sections 330.

The lamp section 330 is mounted in the casing 310 and radiates the light 500 toward the screen body 210 of the screen unit 200 or the road surface while being rotated according to the rotation of the lamp shaft section 320. The lamp section 330 radiates the light 510 through the screen body 210 of the screen unit 200, so that it is possible to clearly recognize the vehicle 10. Alternatively, the lamp section 330 radiates the light 520 toward the road surface through the side screen part 220 of the screen unit 200, so that it is possible to clearly recognize the vehicle 10.

In the present disclosure, the projection unit 300 further includes a driving section 340 that enables the lamp shaft section 320 to be rotated or moved. The driving section 340 is connected to an end portion (upper end portion in FIG. 11) of the lamp shaft section 320 and rotates or moves the lamp shaft section 320. In the present disclosure, the driving section 340 includes a motor, a cylinder, an actuator and the like.

The driving section 340 includes a driving body 341, a rotation hole 343, and a rotation guide part 345. The driving body 341 is mounted in the receiving part 120 of the housing 100 and receives an end portion (lower end portion in FIG. 10) of the lamp shaft section 320.

The rotation hole 343 is formed through one surface (upper surface in FIG. 10) of the driving body 341, the end portion (lower end portion in FIG. 10) of the lamp shaft section 320 is inserted into the rotation hole 343, and the rotation hole 343 is formed to be spaced apart from the lamp shaft section 320 such that the lamp shaft section 320 can rotate, move up and down, or move from front to back and side to side. That is, the rotation hole 343 is formed to be larger than an outer diameter of the lamp shaft section 320.

The rotation guide part 345 is formed in a cross shape around the rotation hole 343, and is formed through the driving body 341 to guide the lamp shaft section 320 to be movable from front to back and side to side.

When the driving section 340 is powered on, the lamp shaft section 320 is rotated at a preset angle θ and the light source 331 is turned on to radiate light onto the grill part 410, as illustrated in FIG. 15. In the present disclosure, while the lamp shaft section 320 is rotated by 65° from outside to inside of the housing 100, the light source 331 of the lamp section 330 radiates the light 510 onto the screen unit 200.

In the present disclosure, the lamp shaft section 320 is formed to be expandable and contractible to move the casing 310 up and down. The lamp shaft section 320 is connected to the driving section 340 and is expanded and contracted by the operation of the driving section 340 to move the casing 310 up and down. The lamp shaft section 320 may be formed in multiple stages that are expanded and contracted by the operation of the driving section 340.

In the present disclosure, the lamp shaft section 320 is mounted such that the casing 310 may be moved from front to back and side to side. The lamp shaft section 320 is moved from front to back and side to side along the rotation guide part 345 by the operation of the driving section 340.

The rotation directions of the lamp section 330 and the lamp shaft section 320 are adjusted according to the steering of the vehicle 10. The rotation directions of the lamp section 330 and the lamp shaft section 320 are adjusted according to the steering of the vehicle 10 by the operation of the driving section 340 under the control of the control unit.

That is, while being rotated according to the steering of the vehicle 10, the lamp section 330 and the lamp shaft section 320 provide surrounding pedestrians or vehicles with information, such as running or stop of the vehicle 10 during running, in the form of an image such as a figure such that the movement and the like of the vehicle 10 are displayed, thereby substantially preventing the occurrence of safety accidents.

Furthermore, as illustrated in FIG. 17, the light source 331 radiates the light 520 toward the road surface while being rotated from inside to outside of the housing 100.

According to the state of the vehicle 10 in the present disclosure, when a driver having a smart key approaches the vehicle 10 within a preset range, the light source 331 displays the light 520 having an image, such as WELCOME, on the road surface, so that the driver can easily recognize the location of the vehicle 10.

With reference to FIG. 18, 19, 20, 21, 22, and FIG. 23, a lighting apparatus for a vehicle in accordance with further another embodiment of the present disclosure will be described. The lighting apparatus for a vehicle in accordance with further another embodiment of the present disclosure includes a vehicle body and the projection units 300. In the present disclosure, the vehicle body refers to the grill part 410 on the front portion of the vehicle 10, a trunk part 420, a side part 430, and a door part 440.

The projection unit 300 is rotatably mounted on the vehicle body and radiates light toward the surface of the vehicle body or a road surface. The aforementioned description on the structure and the operation of the projection unit 300 will be applied to the projection unit 300 in accordance with further another embodiment of the present disclosure. The projection unit 300 is mounted on at least one of the grill part 410 side on the front portion of the vehicle body, the trunk part 420 side, the side part 430 side, and the door part 440 side.

FIG. 18, 19, and FIG. 20 illustrate an example in which the lighting apparatus for a vehicle is mounted on the trunk part 420 side of the vehicle 10. In the example in which the lighting apparatus for a vehicle is mounted on the trunk part 420 side of the vehicle body of the vehicle 10, the screen unit 200 is mounted on the trunk part 420 of the vehicle body of the vehicle 10 and displays light radiated from the projection unit 300.

The projection unit 300 is received in the housing 100 mounted on the side of the trunk part 420. While being rotated, the projection unit 300 radiates light 530 onto the screen unit 200 mounted on the trunk part 420. Alternatively, while being rotated, the projection unit 300 radiate light 540 onto the road surface.

FIG. 21, 22, and FIG. 23 illustrate an example in which the lighting apparatus for a vehicle is mounted on the side part 430 of the door part 440 of the vehicle 10. In the example in which the lighting apparatus for a vehicle is mounted on the side part 430 of the door part 440 of the vehicle body of the vehicle 10, the screen unit 200 is mounted on the side part 430 of the door part 440 of the vehicle body of the vehicle 10 and displays light radiated from the projection unit 300.

The projection unit 300 is received in the housing 100 mounted on the side part 430 of the door part 440. While being rotated, the projection unit 300 radiates light 550 onto the screen unit 200 mounted on the side part 430 of the door part 440. Alternatively, while being rotated, the projection unit 300 radiates light 560 onto the road surface.

The present disclosure having this configuration may recognize or guide the vehicle 10 in the following various modes. Various modes include a welcome mode, a driving guide mode, a communication mode, a driving mode, a danger notification mode, a parking mode, and the like.

In the welcome mode, a boarding time is set in advance with a smart phone or a smart key. When a preset time is reached, the parked autonomous vehicle 10 is started to move to a designated location before boarding. The vehicle 10 radiates a welcome sign on the road surface toward a driver through the "road surface lighting". The driver may recognize whether the vehicle 10 is a vehicle, which the driver gets in, based on a road lighting pattern displayed on the road surface. When the driver gets in the vehicle 10, the road lighting pattern is radiated toward the grill part 410 of the vehicle 10. When the driver gets in and manually drives the vehicle 10, the color of light radiated from the projection unit 300 may be changed white lighting and the like.

In the driving guide mode, when the vehicle 10 travels, the movement direction of the vehicle 10 is guided to transmit a signal to surrounding vehicles and the like. In a manual driving mode, left and right directional signals indicating the degree of turning of a steering wheel are transmitted through the road lighting pattern. In an autonomous driving mode, a pattern for a driving direction is radiated in advance toward the road surface. Different colored lights are displayed according to the manual or autonomous driving mode.

In the communication mode, communication with pedestrians and the like around the vehicle 10 is performed in the autonomous driving mode. When the vehicle 10 is stopped, a front object is sensed, and a sensing signal is transmitted to the pedestrians through the grill part 410 of the vehicle 10. When the vehicle 10 waits for the light to change, various road lighting patterns are radiated onto transmit a pedestrian priority signal and the like.

In the driving mode, a driving direction and the like are transmitted to external vehicles or pedestrians. Different colored lights are displayed according to the manual or autonomous driving mode.

In the danger notification mode, when it is detected through a sensor that a driver in the vehicle 10 is in an emergency situation or in a dangerous situation such as an accident, while the projection unit 300 is rotated, that is, is rotated repeatedly with respect to the screen unit 200 or the road surface and is turned on, the projection unit 300 informs an exterior of a danger state. Different colored lights are displayed according to the manual driving mode or the autonomous mode.

In the parking mode, the parking of the vehicle 10 is notified to external vehicles or pedestrians.

According to the lighting apparatus for a vehicle in accordance with the present disclosure, when a driver approaches the vehicle, light is radiated onto the screen unit of the vehicle or the road surface, so that it is possible to easily recognize the location of the vehicle.

Furthermore, in accordance with the present disclosure, light is radiated onto the screen unit of the vehicle or the road surface to notify driving of the vehicle to surrounding vehicles or pedestrians, so that it is possible to ensure safe driving.

Furthermore, in accordance with the present disclosure, light is radiated onto the screen unit of the vehicle or the road surface to display a guide phrase, a company brand logo, and the like, so that it is possible to improve the sense of luxury of the vehicle.

Furthermore, in accordance with the present disclosure, the projection units 300 are disposed on both sides of the housing, so that the risk of damage due to external impacts and the like can be reduced compared to a case where the projection unit is disposed on the front side thereof, and the repair cost can be reduced.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A lighting apparatus for a vehicle, comprising:
   a housing;
   a screen unit mounted in the housing; and
   a projection unit fixed to the housing and configured to radiate light toward the screen unit,
   wherein:
   the projection unit comprises:
   a casing fixed to the housing; and
   a lamp section fixedly mounted in the casing at a preset angle toward the screen unit and configured to radiate light toward the screen unit;

the lamp section comprises:
　　a light source mounted in the casing and configured to radiate light;
　　a spectroscopic part disposed in front of the light source and configured to diffract or refract the light radiated from the light source;
　　a pattern part disposed in front of the spectroscopic part and configured to form an image of the light radiated from the light source; and
　　a projection lens part disposed in front of the pattern part and configured to diffuse the light radiated from the light source; and
the image formed by the pattern part is selectable from a plurality of images.

2. The lighting apparatus for the vehicle according to claim 1, wherein the light source radiates light obliquely downwardly at a preset angle from the casing toward the screen unit.

3. The lighting apparatus for the vehicle according to claim 1, wherein the lamp section further comprises:
　　a cooling fan part mounted in the casing and configured to cool heat radiated from the light source.

4. The lighting apparatus for the vehicle according to claim 1, wherein at least one lamp section is disposed in the casing.

5. The lighting apparatus for the vehicle according to claim 1, wherein the projection unit is disposed on each lateral side of the housing.

6. The lighting apparatus for the vehicle according to claim 1, wherein the screen unit includes a translucent acrylic material.

7. The lighting apparatus for the vehicle according to claim 1, wherein an image of the light radiated from the projection unit is formed on the screen unit.

8. A lighting apparatus for a vehicle, comprising:
　a housing;
　a screen unit mounted in the housing; and
　a projection unit rotatably mounted in the housing and configured to radiate light toward the screen unit or a road surface while being rotated,
wherein:
　the projection unit comprises:
　　a casing;
　　a lamp shaft section connected to the casing and rotatably mounted in the housing; and
　　a lamp section mounted in the casing and configured to radiate light toward the screen unit or the road surface while being rotated according to rotation of the lamp shaft section;
　the lamp section comprises:
　　a light source mounted in the casing and configured to radiate light;
　　a spectroscopic part disposed in front of the light source and configured to diffract or refract the light radiated from the light source;
　　a pattern part disposed in front of the spectroscopic part and configured to form an image of the light radiated from the light source; and
　　a projection lens part disposed in front of the pattern part and configured to diffuse the light radiated from the light source; and
the image formed by the pattern part is selectable from a plurality of images.

9. The lighting apparatus for the vehicle according to claim 8, wherein an image of the light radiated from the projection unit is formed on the screen unit.

10. The lighting apparatus for the vehicle according to claim 8, wherein the lamp shaft section is formed to be expandable and contractible and moves the casing up and down.

11. The lighting apparatus for the vehicle according to claim 8, wherein the lamp shaft section is mounted to move the casing from front to back and side to side.

12. The lighting apparatus for the vehicle according to claim 8, wherein rotation directions of the lamp section and the lamp shaft section are adjusted according to steering of a vehicle.

13. The lighting apparatus for the vehicle according to claim 8, wherein the projection unit further comprises:
　　a driving section mounted on an end portion of the lamp shaft section and configured to move the lamp shaft section.

14. The lighting apparatus for the vehicle according to claim 8, wherein the projection unit implements a welcome lamp function of allowing a driver of a vehicle to recognize the vehicle by radiating an image set to the driver onto the road surface.

15. A lighting apparatus for a vehicle, comprising:
　a housing;
　a screen unit mounted in the housing; and
　a projection unit rotatably mounted in the housing and configured to radiate light toward the screen unit or a road surface while being rotated,
　wherein the projection unit implements a positioning lamp function in which the projection unit is rotated in the housing from inside to outside of the vehicle to indicate a width of the vehicle.

* * * * *